(12) United States Patent
Soricut et al.

(10) Patent No.: US 10,984,429 B2
(45) Date of Patent: *Apr. 20, 2021

(54) SYSTEMS AND METHODS FOR TRANSLATING TEXTUAL CONTENT

(71) Applicant: SDL Inc., Wakefield, MA (US)

(72) Inventors: Radu Soricut, Manhattan Beach, CA (US); Narayanaswamy Viswanathan, Palo Alto, CA (US); Daniel Marcu, Manhattan Beach, CA (US)

(73) Assignee: SDL Inc., Wakefield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,873

(22) Filed: Jun. 18, 2019

(65) Prior Publication Data

US 2019/0303952 A1 Oct. 3, 2019

Related U.S. Application Data

(63) Continuation of application No. 12/720,536, filed on Mar. 9, 2010, now Pat. No. 10,417,646.

(51) Int. Cl.
*G06F 17/28* (2006.01)
*G06Q 30/02* (2012.01)
(Continued)

(52) U.S. Cl.
CPC ......... *G06Q 30/02* (2013.01); *G06F 9/4843* (2013.01); *G06F 40/58* (2020.01); *G06Q 10/067* (2013.01); *G06Q 30/0283* (2013.01)

(58) Field of Classification Search
CPC .. G06F 17/2827; G06F 17/2836; G06F 40/40; G06F 40/58; G06F 17/2854
(Continued)

(56) References Cited

U.S. PATENT DOCUMENTS 4,055,907 A 11/1977 Henson
4,502,128 A 2/1985 Okajima et al.
(Continued)

FOREIGN PATENT DOCUMENTS

AU 5240198 A 5/1998
AU 694367 B2 7/1998
(Continued)

OTHER PUBLICATIONS

Shaalan etal., Machine Translation of English Noun Phrases into Arabic:, (2004), vol. 17, No. 2, International Journal of Computer Processing of Oriental Languages, 14 pages (Year: 2004).*
(Continued)

*Primary Examiner* — George Chen
*Assistant Examiner* — Freda A Nelson
(74) *Attorney, Agent, or Firm* — Carr & Ferrell LLP

(57) ABSTRACT

A prediction of the cost associated with translating textual content in a source language can be determined. A first quantity estimation of first textual content may be determined. The first textual content is to be translated via human translation. A second quantity estimation of second textual content may also be determined. The second textual content is to be translated via machine translation. An indication of a target language is obtained, wherein the source language and the target language form a language pair. The prediction of the cost associated with translating the first textual content and the second textual content from the source language to the target language is then determined. The prediction is based at least in part on the first quantity estimation, the second quantity estimation, and the language pair.

20 Claims, 5 Drawing Sheets

(51) Int. Cl.
*G06F 9/48* (2006.01)
*G06Q 10/06* (2012.01)
*G06F 40/58* (2020.01)

(58) Field of Classification Search
USPC ............... 705/7.35, 40, 400; 704/1, 2, 4
See application file for complete search history.

(56) References Cited

U.S. PATENT DOCUMENTS

| | | |
|---|---|---|
| 4,509,137 A | 4/1985 | Yoshida |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,845,658 A | 7/1989 | Gifford |
| 4,916,614 A | 4/1990 | Kaji |
| 4,920,499 A | 4/1990 | Skeirik |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,175,684 A | 12/1992 | Chong |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,275,569 A | 1/1994 | Watkins |
| 5,295,068 A | 3/1994 | Nishino et al. |
| 5,302,132 A | 4/1994 | Corder |
| 5,311,429 A | 5/1994 | Tominaga |
| 5,351,189 A | 9/1994 | Doi |
| 5,387,104 A | 2/1995 | Corder |
| 5,408,410 A | 4/1995 | Kaji |
| 5,418,717 A | 5/1995 | Su et al. |
| 5,432,948 A | 7/1995 | Davis et al. |
| 5,442,546 A | 8/1995 | Kaji et al. |
| 5,458,425 A | 10/1995 | Torok |
| 5,477,450 A | 12/1995 | Takeda et al. |
| 5,477,451 A | 12/1995 | Brown et al. |
| 5,488,725 A | 1/1996 | Turtle et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,587,902 A | 12/1996 | Kugimiya |
| 5,640,575 A | 6/1997 | Maruyama |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,708,780 A | 1/1998 | Levergood et al. |
| 5,715,314 A | 2/1998 | Payne et al. |
| 5,724,424 A | 3/1998 | Gifford |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,812,776 A | 9/1998 | Gifford |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,850,561 A | 12/1998 | Church et al. |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,873,056 A | 2/1999 | Liddy |
| 5,893,134 A | 4/1999 | O'Donoghue et al. |
| 5,903,858 A | 5/1999 | Saraki |
| 5,907,821 A | 5/1999 | Kaji et al. |
| 5,909,492 A | 6/1999 | Payne et al. |
| 5,909,681 A | 6/1999 | Passera et al. |
| 5,917,944 A | 6/1999 | Wakisaka et al. |
| 5,930,746 A | 7/1999 | Ting |
| 5,960,384 A | 9/1999 | Brash |
| 5,963,205 A | 10/1999 | Sotomayor |
| 5,966,685 A | 10/1999 | Flanagan et al. |
| 5,966,686 A | 10/1999 | Heidorn et al. |
| 5,974,372 A | 10/1999 | Barnes |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,044,344 A | 3/2000 | Kanevsky |
| 6,047,252 A | 4/2000 | Kumano et al. |
| 6,049,785 A | 4/2000 | Gifford |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,085,162 A | 7/2000 | Cherry |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,026 B1 | 1/2001 | Tillmann et al. |
| 6,182,027 B1 | 1/2001 | Nasukawa et al. |
| 6,185,524 B1 | 2/2001 | Carus et al. |
| 6,195,649 B1 | 2/2001 | Gifford |
| 6,199,051 B1 | 3/2001 | Gifford |
| 6,205,437 B1 | 3/2001 | Gifford |
| 6,205,456 B1 | 3/2001 | Nakao |
| 6,206,700 B1 | 3/2001 | Brown et al. |
| 6,212,634 B1 | 4/2001 | Geer et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,279,112 B1 | 8/2001 | O'toole, Jr. et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,356,865 B1 | 3/2002 | Franz et al. |
| 6,360,196 B1 | 3/2002 | Poznanski et al. |
| 6,389,387 B1 | 5/2002 | Poznanski et al. |

(56) References Cited

U.S. PATENT DOCUMENTS

| | | |
|---|---|---|
| 6,393,388 B1 | 5/2002 | Franz et al. |
| 6,393,389 B1 | 5/2002 | Chanod et al. |
| 6,415,250 B1 | 7/2002 | van den Akker |
| 6,415,257 B1 | 7/2002 | Junqua |
| 6,449,599 B1 | 9/2002 | Payne et al. |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,477,524 B1 | 11/2002 | Taskiran |
| 6,480,698 B2 | 11/2002 | Ho et al. |
| 6,490,358 B1 | 12/2002 | Geer et al. |
| 6,490,549 B1 | 12/2002 | Ulicny et al. |
| 6,490,563 B2 | 12/2002 | Hon |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,598,046 B1 | 7/2003 | Goldberg et al. |
| 6,604,101 B1 | 8/2003 | Chan et al. |
| 6,609,087 B1 | 8/2003 | Miller et al. |
| 6,647,364 B1 | 11/2003 | Yumura et al. |
| 6,658,627 B1 | 12/2003 | Gallup |
| 6,691,279 B2 | 2/2004 | Yoden et al. |
| 6,704,741 B1 | 3/2004 | Lively, Jr. et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,865,528 B1 | 3/2005 | Huang |
| 6,885,985 B2 | 4/2005 | Hull |
| 6,901,361 B1 | 5/2005 | Portilla |
| 6,904,402 B1 | 6/2005 | Wang et al. |
| 6,910,003 B1 | 6/2005 | Arnold et al. |
| 6,920,419 B2 | 7/2005 | Kitamura |
| 6,952,665 B1 | 10/2005 | Shimomura et al. |
| 6,976,207 B1 | 12/2005 | Rujan |
| 6,983,239 B1 | 1/2006 | Epstein |
| 6,990,439 B2 | 1/2006 | Xun |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,013,264 B2 | 3/2006 | Dolan |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,908 B1 | 4/2006 | Huang |
| 7,031,911 B2 | 4/2006 | Zhou et al. |
| 7,050,964 B2 | 5/2006 | Menzes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,124,092 B2 | 10/2006 | O'toole, Jr. et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 * | 1/2007 | Scanlan ............... G06F 40/58 704/2 |
| 7,174,289 B2 | 2/2007 | Sukehiro |
| 7,177,792 B2 | 2/2007 | Knight et al. |
| 7,191,115 B2 | 3/2007 | Moore |
| 7,191,447 B1 | 3/2007 | Ellis et al. |
| 7,194,403 B2 | 3/2007 | Okura et al. |
| 7,197,451 B1 | 3/2007 | Carter et al. |
| 7,200,550 B2 | 4/2007 | Menezes et al. |
| 7,206,736 B2 | 4/2007 | Moore |
| 7,207,005 B2 | 4/2007 | Laktritz |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,272,639 B1 | 9/2007 | Levergood et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,333,927 B2 | 2/2008 | Lee |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,353,165 B2 | 4/2008 | Zhou |
| 7,356,457 B2 | 4/2008 | Pinkham et al. |
| 7,369,984 B2 | 5/2008 | Fairweather |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,223 B2 | 6/2008 | Atkin |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,448,040 B2 | 11/2008 | Ellis et al. |
| 7,451,125 B2 | 11/2008 | Bangalore |
| 7,454,326 B2 | 11/2008 | Marcu et al. |
| 7,496,497 B2 | 2/2009 | Liu |
| 7,509,313 B2 | 3/2009 | Colledge |
| 7,516,062 B2 | 4/2009 | Chen et al. |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,549 B2 | 11/2009 | Di Cristo et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 | 12/2009 | Nieh |
| 7,668,782 B1 | 2/2010 | Reistad et al. |
| 7,680,646 B2 | 3/2010 | Lux-Pogodalla et al. |
| 7,680,647 B2 | 3/2010 | Moore |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,865,358 B2 | 1/2011 | Green |
| 7,925,493 B2 | 4/2011 | Watanabe |
| 7,925,494 B2 | 4/2011 | Cheng et al. |
| 7,945,437 B2 | 5/2011 | Mount et al. |
| 7,957,953 B2 | 6/2011 | Moore |
| 7,974,833 B2 | 7/2011 | Soricut et al. |

(56) References Cited

U.S. PATENT DOCUMENTS

| | | |
|---|---|---|
| 7,974,843 B2 | 7/2011 | Schneider |
| 7,974,976 B2 | 7/2011 | Yahia et al. |
| 7,983,896 B2 | 7/2011 | Ross et al. |
| 7,983,897 B2 | 7/2011 | Chin et al. |
| 8,060,360 B2 | 11/2011 | He |
| 8,078,450 B2 | 12/2011 | Anisimovich |
| 8,135,575 B1 | 3/2012 | Dean |
| 8,145,472 B2 | 3/2012 | Shore et al. |
| 8,195,447 B2 | 6/2012 | Anismovich |
| 8,214,196 B2 | 7/2012 | Yamada et al. |
| 8,219,382 B2 | 7/2012 | Kim et al. |
| 8,234,106 B2 | 7/2012 | Marcu et al. |
| 8,239,186 B2 | 8/2012 | Chin |
| 8,239,207 B2 | 8/2012 | Seligman et al. |
| 8,244,519 B2 | 8/2012 | Bicici et al. |
| 8,249,854 B2 * | 8/2012 | Nikitin .................. G06F 40/58 704/2 |
| 8,265,923 B2 | 9/2012 | Chatterjee et al. |
| 8,275,600 B2 | 9/2012 | Bilac et al. |
| 8,286,185 B2 | 10/2012 | Ellis et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |
| 8,352,244 B2 | 1/2013 | Gao et al. |
| 8,364,463 B2 | 1/2013 | Miyamoto |
| 8,380,486 B2 | 2/2013 | Soricut et al. |
| 8,386,234 B2 | 2/2013 | Uchimoto et al. |
| 8,423,346 B2 | 4/2013 | Seo et al. |
| 8,433,556 B2 | 4/2013 | Fraser et al. |
| 8,442,812 B2 | 5/2013 | Ehsani |
| 8,442,813 B1 | 5/2013 | Popat |
| 8,468,149 B1 | 6/2013 | Lung et al. |
| 8,504,351 B2 | 8/2013 | Waibel et al. |
| 8,521,506 B2 | 8/2013 | Lancaster et al. |
| 8,527,260 B2 | 9/2013 | Best |
| 8,543,563 B1 | 9/2013 | Nikoulina et al. |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight et al. |
| 8,606,900 B1 | 12/2013 | Levergood et al. |
| 8,612,203 B2 | 12/2013 | Foster et al. |
| 8,612,205 B2 | 12/2013 | Hanneman et al. |
| 8,615,388 B2 | 12/2013 | Li |
| 8,615,389 B1 | 12/2013 | Marcu |
| 8,635,327 B1 | 1/2014 | Levergood et al. |
| 8,635,539 B2 | 1/2014 | Young et al. |
| 8,655,642 B2 | 2/2014 | Fux et al. |
| 8,666,725 B2 | 3/2014 | Och |
| 8,676,563 B2 | 3/2014 | Soricut et al. |
| 8,688,454 B2 | 4/2014 | Zheng |
| 8,694,303 B2 | 4/2014 | Hopkins et al. |
| 8,725,496 B2 | 5/2014 | Zhao et al. |
| 8,762,128 B1 | 6/2014 | Brants et al. |
| 8,768,686 B2 | 7/2014 | Sarikaya et al. |
| 8,775,154 B2 | 7/2014 | Clinchant |
| 8,818,790 B2 | 8/2014 | He et al. |
| 8,825,466 B1 | 9/2014 | Wang et al. |
| 8,831,928 B2 | 9/2014 | Marcu et al. |
| 8,843,359 B2 | 9/2014 | Lauder |
| 8,862,456 B2 | 10/2014 | Krack et al. |
| 8,886,515 B2 | 11/2014 | Van Assche |
| 8,886,517 B2 | 11/2014 | Soricut et al. |
| 8,886,518 B1 | 11/2014 | Wang et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,942,973 B2 | 1/2015 | Viswanathan |
| 8,943,080 B2 | 1/2015 | Marcu et al. |
| 8,972,268 B2 | 3/2015 | Waibel |
| 8,977,536 B2 | 3/2015 | Och |
| 8,990,064 B2 | 3/2015 | Marcu et al. |
| 9,026,425 B2 | 5/2015 | Nikoulina |
| 9,053,202 B2 | 6/2015 | Viswanadha |
| 9,081,762 B2 | 7/2015 | Wu et al. |
| 9,122,674 B1 | 9/2015 | Wong et al. |
| 9,141,606 B2 | 9/2015 | Marciano |
| 9,152,622 B2 | 10/2015 | Marcu et al. |
| 9,176,952 B2 | 11/2015 | Aikawa |
| 9,183,192 B1 | 11/2015 | Ruby, Jr. |
| 9,183,198 B2 | 11/2015 | Shen et al. |
| 9,197,736 B2 | 11/2015 | Davis et al. |
| 9,201,870 B2 | 12/2015 | Jurach |
| 9,208,144 B1 | 12/2015 | Abdulnasyrov |
| 9,213,694 B2 | 12/2015 | Hieber et al. |
| 9,396,184 B2 | 7/2016 | Roy |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,473 B2 | 3/2017 | Leydon |
| 9,613,026 B2 | 4/2017 | Hodson |
| 10,261,994 B2 | 4/2019 | Marcu et al. |
| 10,319,252 B2 | 6/2019 | Galley et al. |
| 10,402,498 B2 | 9/2019 | Marcu et al. |
| 10,417,646 B2 | 9/2019 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0083103 A1 | 6/2002 | Ballance |
| 2002/0086268 A1 | 7/2002 | Shpiro |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0115044 A1 | 8/2002 | Shpiro |
| 2002/0124109 A1 | 9/2002 | Brown |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0004705 A1 | 1/2003 | Kempe |
| 2003/0009320 A1 | 1/2003 | Furuta |
| 2003/0009322 A1 | 1/2003 | Marcu |
| 2003/0014747 A1 | 1/2003 | Spehr |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0077559 A1 | 4/2003 | Braunberger et al. |
| 2003/0129571 A1 | 7/2003 | Kim |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0192046 A1 | 10/2003 | Spehr |
| 2003/0200094 A1 | 10/2003 | Gupta |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0023193 A1 | 2/2004 | Wen et al. |
| 2004/0024581 A1 | 2/2004 | Koehn et al. |
| 2004/0030551 A1 | 2/2004 | Marcu et al. |

(56) References Cited

U.S. PATENT DOCUMENTS

| | | |
|---|---|---|
| 2004/0034520 A1 | 2/2004 | Langkilde-Geary |
| 2004/0044517 A1 | 3/2004 | Palmquist |
| 2004/0044530 A1 | 3/2004 | Moore |
| 2004/0059708 A1 | 3/2004 | Dean et al. |
| 2004/0059730 A1 | 3/2004 | Zhou |
| 2004/0068411 A1 | 4/2004 | Scanlan |
| 2004/0093327 A1 | 5/2004 | Anderson et al. |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0176945 A1 | 9/2004 | Inagaki et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0255281 A1 | 12/2004 | Imamura et al. |
| 2004/0260532 A1 | 12/2004 | Richardson et al. |
| 2005/0021322 A1 | 1/2005 | Richardson et al. |
| 2005/0021323 A1 | 1/2005 | Li |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0054444 A1 | 3/2005 | Okada |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0107999 A1 | 5/2005 | Kempe et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0171944 A1 | 8/2005 | Palmquist |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0095526 A1 | 5/2006 | Levergood et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136193 A1 | 6/2006 | Lux-Pogodalla et al. |
| 2006/0136824 A1 | 6/2006 | Lin |
| 2006/0142995 A1 | 6/2006 | Knight et al. |
| 2006/0150069 A1 | 7/2006 | Chang |
| 2006/0165040 A1 | 7/2006 | Rathod et al. |
| 2006/0167984 A1 | 7/2006 | Fellenstein et al. |
| 2006/0190241 A1 | 8/2006 | Goutte et al. |
| 2006/0282255 A1 | 12/2006 | Lu et al. |
| 2007/0010989 A1 | 1/2007 | Faruquie et al. |
| 2007/0015121 A1 | 1/2007 | Johnson et al. |
| 2007/0016400 A1 | 1/2007 | Soricutt et al. |
| 2007/0016401 A1 | 1/2007 | Ehsani et al. |
| 2007/0016918 A1 | 1/2007 | Alcorn et al. |
| 2007/0020604 A1 | 1/2007 | Chulet |
| 2007/0033001 A1 | 2/2007 | Muslea et al. |
| 2007/0043553 A1 | 2/2007 | Dolan |
| 2007/0050182 A1 | 3/2007 | Sneddon et al. |
| 2007/0060114 A1 | 3/2007 | Ramer et al. |
| 2007/0073532 A1 | 3/2007 | Brockett et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0040095 A1 | 2/2008 | Sinha et al. |
| 2008/0046229 A1 | 2/2008 | Maskey et al. |
| 2008/0052061 A1 | 2/2008 | Kim et al. |
| 2008/0065478 A1 | 3/2008 | Kohlmeier et al. |
| 2008/0065974 A1 | 3/2008 | Campbell |
| 2008/0086298 A1 | 4/2008 | Anismovich |
| 2008/0109209 A1 | 5/2008 | Fraser et al. |
| 2008/0109374 A1 | 5/2008 | Levergood et al. |
| 2008/0114583 A1 | 5/2008 | Al-Onaizan et al. |
| 2008/0154577 A1 | 6/2008 | Kim et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0201344 A1 | 8/2008 | Levergood et al. |
| 2008/0215418 A1 | 9/2008 | Kolve et al. |
| 2008/0243450 A1 | 10/2008 | Feblowitz et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0288240 A1 | 11/2008 | D'Agostini |
| 2008/0300857 A1 | 12/2008 | Barbaiani et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0094017 A1 | 4/2009 | Chen |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1 | 8/2009 | Wong et al. |
| 2009/0217196 A1 | 8/2009 | Neff et al. |
| 2009/0234634 A1 | 9/2009 | Chen et al. |
| 2009/0234635 A1 | 9/2009 | Bhatt et al. |
| 2009/0240539 A1 | 9/2009 | Slawson |
| 2009/0241115 A1 | 9/2009 | Raffo et al. |
| 2009/0248662 A1 | 10/2009 | Murdock |
| 2009/0313005 A1 | 12/2009 | Jaquinta |
| 2009/0313006 A1 | 12/2009 | Tang |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0057439 A1 | 3/2010 | Ideuchi et al. |
| 2010/0057561 A1 | 3/2010 | Gifford |
| 2010/0082326 A1 | 4/2010 | Bangalore et al. |
| 2010/0121630 A1 | 5/2010 | Mende et al. |
| 2010/0138210 A1 | 6/2010 | Seo et al. |
| 2010/0138213 A1 | 6/2010 | Bicici et al. |
| 2010/0158238 A1 | 6/2010 | Saushkin |
| 2010/0174524 A1 | 7/2010 | Koehn |
| 2010/0179803 A1 | 7/2010 | Sawaf |
| 2010/0204978 A1 | 8/2010 | Gao et al. |
| 2011/0029300 A1 | 2/2011 | Marcu et al. |
| 2011/0066469 A1 | 3/2011 | Kadosh |
| 2011/0066643 A1* | 3/2011 | Cooper ............... G06F 16/38 707/770 |
| 2011/0082683 A1 | 4/2011 | Soricut et al. |

(56) References Cited

U.S. PATENT DOCUMENTS

| | | |
|---|---|---|
| 2011/0082684 A1 | 4/2011 | Soricut et al. |
| 2011/0097693 A1 | 4/2011 | Crawford |
| 2011/0184722 A1 | 7/2011 | Sneddon et al. |
| 2011/0191096 A1 | 8/2011 | Sarikaya et al. |
| 2011/0191410 A1 | 8/2011 | Refuah et al. |
| 2011/0202330 A1 | 8/2011 | Dai et al. |
| 2011/0225104 A1 | 9/2011 | Soricut et al. |
| 2011/0289405 A1 | 11/2011 | Fritsch et al. |
| 2011/0307241 A1 | 12/2011 | Waibel et al. |
| 2012/0016657 A1 | 1/2012 | He et al. |
| 2012/0022852 A1 | 1/2012 | Tregaskis |
| 2012/0096019 A1 | 4/2012 | Manickam et al. |
| 2012/0116751 A1 | 5/2012 | Bernardini et al. |
| 2012/0136646 A1 | 5/2012 | Kraenzel et al. |
| 2012/0150441 A1 | 6/2012 | Ma et al. |
| 2012/0150529 A1 | 6/2012 | Kim et al. |
| 2012/0185478 A1 | 7/2012 | Topham et al. |
| 2012/0191457 A1 | 7/2012 | Minnis et al. |
| 2012/0203776 A1 | 8/2012 | Nissan |
| 2012/0232885 A1 | 9/2012 | Barbosa et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0278356 A1 | 11/2012 | Furuta et al. |
| 2012/0323554 A1 | 12/2012 | Hopkins et al. |
| 2012/0330990 A1 | 12/2012 | Chen et al. |
| 2013/0018650 A1 | 1/2013 | Moore et al. |
| 2013/0024184 A1 | 1/2013 | Vogel et al. |
| 2013/0103381 A1 | 4/2013 | Assche |
| 2013/0124185 A1 | 5/2013 | Sarr et al. |
| 2013/0144594 A1 | 6/2013 | Bangalore et al. |
| 2013/0173247 A1 | 7/2013 | Hodson |
| 2013/0226563 A1 | 8/2013 | Hirate |
| 2013/0226945 A1 | 8/2013 | Swinson et al. |
| 2013/0238310 A1 | 9/2013 | Viswanathan |
| 2013/0290339 A1 | 10/2013 | LuVogt et al. |
| 2013/0325442 A1 | 12/2013 | Dahlmeier |
| 2014/0006003 A1 | 1/2014 | Soricut et al. |
| 2014/0019114 A1 | 1/2014 | Travieso et al. |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0149102 A1 | 5/2014 | Marcu et al. |
| 2014/0188453 A1 | 7/2014 | Marcu et al. |
| 2014/0229257 A1 | 8/2014 | Reistad et al. |
| 2014/0297252 A1 | 10/2014 | Prasad et al. |
| 2014/0350931 A1 | 11/2014 | Levit et al. |
| 2014/0358519 A1 | 12/2014 | Mirkin |
| 2014/0358524 A1 | 12/2014 | Papula |
| 2014/0365201 A1 | 12/2014 | Gao |
| 2015/0051896 A1 | 2/2015 | Simard et al. |
| 2015/0106076 A1 | 4/2015 | Hieber et al. |
| 2015/0186362 A1 | 7/2015 | Li |
| 2019/0042566 A1 | 2/2019 | Marcu et al. |
| 2019/0303952 A1 | 10/2019 | Soricut et al. |

FOREIGN PATENT DOCUMENTS

| | | | |
|---|---|---|---|
| AU | 5202299 A | | 10/1999 |
| CA | 2221506 A1 | | 12/1996 |
| CA | 2408819 | | 11/2006 |
| CA | 2475857 | | 12/2008 |
| CA | 2480398 | | 6/2011 |
| CN | 102193914 A | | 9/2011 |
| CN | 102662935 A | | 9/2012 |
| CN | 102902667 A | | 1/2013 |
| DE | 69525374 T2 | | 8/2002 |
| DE | 69431306 T2 | | 5/2003 |
| DE | 69633564 T2 | | 11/2005 |
| DE | 202005022113.9 | | 2/2014 |
| EP | 0469884 | | 2/1992 |
| EP | 0715265 | | 6/1996 |
| EP | 0830774 A2 | | 3/1998 |
| EP | 0933712 A2 | | 8/1999 |
| EP | 0933712 A3 | | 1/2001 |
| EP | 1128301 A2 | | 8/2001 |
| EP | 1128302 A2 | | 8/2001 |
| EP | 1128303 A2 | | 8/2001 |
| EP | 0803103 A1 | | 2/2002 |
| EP | 1235177 A2 | | 8/2002 |
| EP | 0734556 B1 | | 9/2002 |
| EP | 1488338 A2 | | 9/2004 |
| EP | 0830774 B1 | | 10/2004 |
| EP | 1489523 A2 | | 12/2004 |
| EP | 1947574 A1 | | 7/2008 |
| EP | 1488338 B1 | | 4/2010 |
| EP | 2299369 A1 | | 3/2011 |
| GB | 2241359 A | | 8/1991 |
| JP | 07244666 | | 9/1995 |
| JP | H08101837 A | | 4/1996 |
| JP | 10011447 | | 1/1998 |
| JP | H10509543 A | | 9/1998 |
| JP | H11507752 A | | 7/1999 |
| JP | 11272672 | | 10/1999 |
| JP | 3190881 B2 | | 7/2001 |
| JP | 3190882 B2 | | 7/2001 |
| JP | 3260693 B2 | | 2/2002 |
| JP | 3367675 B2 | | 1/2003 |
| JP | 2003157402 A | | 5/2003 |
| JP | 2004501429 | | 1/2004 |
| JP | 2004062726 | | 2/2004 |
| JP | 3762882 B2 | | 4/2006 |
| JP | 2006216073 A | | 8/2006 |
| JP | 2007042127 A | | 2/2007 |
| JP | 4485548 B2 | | 6/2010 |
| JP | 4669373 B2 | | 4/2011 |
| JP | 4669430 B2 | | 4/2011 |
| JP | 5452868 B2 | | 1/2014 |
| WO | WO9516971 A1 | | 6/1995 |
| WO | WO9613013 A1 | | 5/1996 |
| WO | WO9642041 A2 | | 12/1996 |
| WO | WO9715885 A1 | | 5/1997 |
| WO | WO9819224 A2 | | 5/1998 |
| WO | WO9952626 A1 | | 10/1999 |
| WO | WO2002039318 A1 | | 5/2002 |
| WO | WO2003083709 | | 10/2003 |
| WO | WO2003083710 A2 | | 10/2003 |
| WO | WO2004042615 | | 5/2004 |
| WO | WO2007056563 | | 5/2007 |
| WO | WO2007068123 A1 | | 6/2007 |
| WO | WO2010062540 A1 | | 6/2010 |
| WO | WO2010062542 A1 | | 6/2010 |
| WO | WO-2010062542 A1 * | 6/2010 | ............ G06F 40/44 |
| WO | WO2011041675 | | 4/2011 |
| WO | WO2011162947 | | 12/2011 |

OTHER PUBLICATIONS

Isahara et al., Analysis, Generation and Semantic Representation in CONTRAST—A Context-Based Machine Translation System, 1995, Systems and Computers in Japan, vol. 26, No. 14, pp. 37-53 (Year: 1995).*

Shahahbi, Mitra, "An Evaluation of Output Quality of Machine Translation Program", 2009, Student Research Workshop, RANLP 2009—Borovets, Bulgaria, pp. 71-75 (Year: 2009).*

Knight, K. and Al-Onaizan, Y., "A Primer on Finite-State Software for Natural Language Processing", 1999 (available at http://www.isLedullicensed-sw/carmel).

Knight, K. and Al-Onaizan, Y., "Translation with Finite-State Devices," Proceedings of the 4th AMTA Conference, 1998.

Knight, K. and Chander, I., "Automated Postediting of Documents," 1994, Proc. of the 12th Conference on Artificial Intelligence, pp. 779-784.

Knight, K. and Graehl, J., "Machine Transliteration", 1997, Proc. of the ACL-97, Madrid, Spain, pp. 128-135.

Knight, K. and Hatzivassiloglou, V., "Two-Level, Many-Paths Generation," 1995, Proc. of the 33rd Annual Conference of the ACL, pp. 252-260.

Knight, K. and Luk, S., "Building a Large-Scale Knowledge Base for Machine Translation," 1994, Proc. of the 12th Conference on Artificial Intelligence, pp. 773-778.

(56) References Cited

OTHER PUBLICATIONS

Knight, K. and Marcu, D., "Statistics-Based Summarization—Step One: Sentence Compression," 2000, American Association for Artificial Intelligence Conference, pp. 703-710.
Knight, K. and Yamada, K., "A Computational Approach to Deciphering Unknown Scripts," 1999, Proc. of the ACL Workshop on Unsupervised Learning in Natural Language Processing.
Knight, Kevin, "A Statistical MT Tutorial Workbook," 1999, JHU Summer Workshop (available at http://www.isi.edu/natural-language/mUwkbk.rtf).
Knight, Kevin, "Automating Knowledge Acquisition for Machine Translation," 1997, AI Magazine, vol. 18, No. 4.
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999, Computational Linguistics, vol. 25, No. 4.
Knight, Kevin, "Integrating Knowledge Acquisition and Language Acquisition", May 1992, Journal of Applied Intelligence, vol. 1, No. 4.
Knight, Kevin, "Learning Word Meanings by Instruction," 1996, Proc. of the D National Conference on Artificial Intelligence, vol. 1, pp. 447-454.
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. i-105, Dec. 2003.
Koehn, P. and Knight, K., "ChunkMT: Statistical Machine Translation with Richer Linguistic Knowledge," Apr. 2002, Information Sciences Institution.
Koehn, P. and Knight, K., "Estimating Word Translation Probabilities from Unrelated Monolingual Corpora Using the EM Algorithm," 2000, Proc. of the 17th meeting of the AAAI.
Koehn, P. and Knight, K., "Knowledge Sources for Word-Level Translation Models," 2001, Conference on Empirical Methods in Natural Language Processing.
Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.
Kupiec, Julian, "An Algorithm for Finding Noun Phrase Correspondences in Bilingual Corpora," In Proceedings of the 31st Annual Meeting of the ACL, 1993, pp. 17-22.
Kurohashi, S. and Nagao, M., "Automatic Detection of Discourse Structure by Checking Surface Information in Sentences," 1994, Proc. of COL-LING '94, vol. 2, pp. 1123-1127.
Langkilde, I. and Knight, K., "Generation that Exploits Corpus-Based Statistical Knowledge," 1998, Proc. of the COLING-ACL, pp. 704-710.
Langkilde, I. and Knight, K., "The Practical Value of N-Grams in Generation," 1998, Proc. of the 9th International Natural Language Generation Workshop, pp. 248-255.
Langkilde, Irene, "Forest-Based Statistical Sentence Generation," 2000, Proc. of the 1st Conference on North American chapter of the ACL, Seattle, WA, pp. 170-177.
Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.
Langkilde-Geary, Irene, "An Empirical Verification of Coverage and Correctness for a General-Purpose Sentence Generator," 1998, Proc. 2nd Int'l Natural Language Generation Conference.
Lee, Yue-Shi, "Neural Network Approach to Adaptive Learning: with an Application to Chinese Homophone Disambiguation," IEEE 2001 pp. 1521-1526. Jul. 2001.
Lita, L., et al., "tRuEcasIng," 2003 Proceedings of the 41st Annual Meeting of the Assoc. for Computational Linguistics (In Hinrichs, E. and Roth, D.—editors), pp. 152-159. Jul. 2003.
Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Manning, C. and Schutze, H., "Foundations of Statistical Natural Language Processing," 2000, The MIT Press, Cambridge, MA [Front Matter].
Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACLIEACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Metze, F. et al., "The NESPOLE! Speech-to-Speech Translation System," Proc. of the HLT 2002, 2nd Int'l. Conf. on Human Language Technology (San Francisco, CA), © 2002, pp. 378-383.
Mikheev et al., "Named Entity Recognition without Gazeteers," 1999, Proc. of European Chapter of the ACL, Bergen, Norway, pp. 1-8.
Miike et al., "A Full-Text Retrieval System with a Dynamic Abstract Generation Function," 1994, Proceedings of SI-GIR '94, pp. 152-161.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Mohri, Mehryar, "Regular Approximation of Context Free Grammars Through Transformation", 2000, pp. 251-261, "Robustness in Language and Speech Technology", Chapter 9, Kluwer Academic Publishers.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun.

(56) References Cited

OTHER PUBLICATIONS 10, 2010, pp. 546-554. Retrieved from: https://www.researchgate.net/publication/220817231_Online_Learning_for_Interactive_Statistical_Machine_Translation.

Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.

Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.

Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.

Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.

Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12-3112] Proceedings of the Seventh Workshop on Statistical Machine Translation, Jun. 7, 2012, pp. 109-113. Retrieved from: http://aclanthology.info/volumes/proceedings-of-the-seventh-workshop-onstatistical-machine-translation.

Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet:<https://lilt.com/kb/translators/best-practices>, 2 pages.

"Data Security—Knowledge Base," Lilt website [online], Oct. 14, 2016 [retrieved on Oct. 19, 2017], Retrieved from the Internet:<https://lilt.com/kb/security>, 1 pages.

"Data Security and Confidentiality," Lilt website [online], 2017 [retrieved on Oct. 19, 2017], Retrieved from the Internet:<https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

"Memories (API)—Knowledge Base," Lilt website [online], Jun. 2, 2017 [retrieved on Oct. 19, 2017], Retrieved from the Internet:<https://lilt.com/kb/api/memories>, 1 page.

"Quoting—Knowledge Base," Lilt website [online], Jun. 7, 2017 [retrieved on Oct. 19, 2017], Retrieved from the Internet:<https://lilt.com/kb/project-managers/quoting>, 4 pages.

"The Editor—Knowledge Base," Lilt website [online], Aug. 15, 2017 [retrieved on Oct. 19, 2017], Retrieved from the Internet:<https://lilt.com/kb/translators/editor>, 5 pages.

"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.

"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.

"Getting Started—Knowledge Base," Lilt website [online], Apr. 11, 2017 [retrieved on Oct. 20, 2017], Retrieved from the Internet:<https://lilt.com/kb/translators/getting-started>, 2 pages.

"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.

"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.

"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.

"Lilt API _ API Reference," Lilt website [online], retrieved on Oct. 20, 2017, Retrieved from the Internet:<https://lilt.com/docs/api>, 53 pages.

"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.

"Projects—Knowledge Base," Lilt website [online], Jun. 7, 2017, retrieved on Oct. 20, 2017, Retrieved from the Internet:<https://lilt.com/kb/project-managers/projects>, 3 pages.

"Getting Started with lilt.js—Knowledge Base," Lilt website [online], May 30, 2017, retrieved on Oct. 20, 2017, Retrieved from the Internet:<https://lilt.com/kb/api/lilt-js>, 6 pages.

"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.

Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.

(56) References Cited

OTHER PUBLICATIONS

Frederking et al., "Three Heads are Better Than One," In Proceedings of the 4th Conference on Applied Natural Language Processing, Stuttgart, Germany, 1994, pp. 95-100.
Yasuda et al., "Automatic Machine Translation Selection Scheme to Output the Best Result," Proc. of LREC, 2002, pp. 525-528.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Huang et al., "Statistical syntax-directed translation with extended domain of locality," Jun. 9, 2006, In Proceedings of AMTA, pp. 1-8.
"Office Action," German Application No. 112005002534.9, dated Feb. 7, 2018, 6 pages (9 pages including translation).
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Graehl, J and Knight, K, May 2004, "Training Tree Transducers," in NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action dated Jun. 7, 2004 in Canadian Patent Application 2408819, filed May 11, 2001.
First Office Action dated Jun. 14, 2007 in Canadian Patent Application 2475857, filed Mar. 11, 2003.
Carl, M. "A Constructivist Approach to Machine Translation," 1998, New Methods of Language Processing and Computational Natural Language Learning, pp. 247-256.
Chen, et al., "Machine Translation: An Integrated Approach," 1995, Proc. of 6th Int'l Cont. on Theoretical and Methodological Issue in MT, pp. 287-294.
Cheng et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Yossi, Cohen "Interpreter for FUF," available at URL <ftp://ftp.cs.bgu.ac.il/pub/people/elhadad/fuf-life.lf> (downloaded Jun. 1, 2008).
Corston-Oliver, S., "Beyond String Matching and Cue Phrases: Improving Efficiency and Coverage in Discourse Analysis", 1998, The AAAI Spring Symposium on Intelligent Text Summarization, pp. 9-15.

Covington, "An Algorithm to Align Words for Historical Comparison", Computational Linguistics, 1996, vol. 22, No. 4, pp. 481-496.
Dagan et al., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab et al., "A Statistical Word-Level Translation Model for Comparable Corpora," 2000, In Proc. of the Conference on Content Based Multimedia Information Access (RIAO).
Diab, M., "An Unsupervised Method for Multilingual Word Sense Tagging Using Parallel Corpora: A Preliminary Investigation", 2000, SIGLEX Workshop on Word Senses and Multi-Linguality, pp. 1-9.
Eisner, Jason, "Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, vol. 23 No. 2, pp. 195-239.
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad, Michael, "FUF: the Universal Unifier User Manual Version 5.2", 1993, Department of Computer Science, Ben Gurion University, Beer Sheva, Israel.
Elhadad, Michael, "Using Argumentation to Control Lexical Choice: A Functional Unification Implementation", 1992, Ph.D. Thesis, Graduate School of Arts and Sciences, Columbia University.
Elhadad, M. and Robin, J., "SURGE: a Comprehensive Plug-in Syntactic Realization Component for Text Generation", 1999 (available at http://www.cs.bgu.ac.il/-elhadad/pub.html).
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Linguistics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>, retrieved on May 6, 2004, abstract.
Ren, Fuji and Shi, Hongchi, "Parallel Machine Translation: Principles and Practice," Engineering of Complex Computer Systems, 2001 Proceedings, Seventh IEEE Int'l. Conference, pp. 249-259, 2001.
Fung et al, "Mining Very-Non-Parallel Corpora: Parallel Sentence and Lexicon Extraction via Bootstrapping and EM", In EMNLP 2004.
Fung, P. and Yee, L., "An IR Approach for Translating New Words from Nonparallel, Comparable Texts", 1998, 36th Annual Meeting of the ACL, 17th International Conference on Computational Linguistics, pp. 414-420.
Fung, Pascale, "Compiling Bilingual Lexicon Entries From a Non-Parallel English-Chinese Corpus", 1995, Proc., of the Third Workshop on Very Large Corpora, Boston, MA, pp. 173-183.
Gale, W. and Church, K., "A Program for Aligning Sentences in Bilingual Corpora," 1991, 29th Annual Meeting of the ACL, pp. 177-183.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.

(56) References Cited

OTHER PUBLICATIONS

Germann et al., "Fast Decoding and Optimal Decoding for Machine Translation", 2001, Proc. of the 39th Annual Meeting of the ACL, Toulouse, France, pp. 228-235.
Germann, Ulrich: "Building a Statistical Machine Translation System from Scratch: How Much Bang for the Buck Can We Expect?" Proc. of the Data-Driven MT Workshop of ACL-01, Toulouse, France, 2001.
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grefenstette, Gregory, "The World Wide Web as a Resource for Example-Based Machine Translation Tasks", 1999, Translating and the Computer 21, Proc. of the 21st International Conf. on Translating and the Computer. London, UK, 12 pp.
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
Hatzivassiloglou, V. et al., "Unification-Based Glossing", 1995, Proc. of the International Joint Conference on Artificial Intelligence, pp. 1382-1389.
Huang et al., "Relabeling Syntax Trees to Improve Syntax-Based Machine Translation Quality," Jun. 4-9, 2006, in Proc. of the Human Language Technology Conference of the North American Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Klein et al., "Accurate Unlexicalized Parsing," Jul. 2003, in Proc. of the 41st Annual Meeting of the ACL, pp. 423-430.
Knight et al., "Integrating Knowledge Bases and Statistics in MT," 1994, Proc. of the Conference of the Association for Machine Translation in the Americas.
Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.
Varga et al., "Parallel Corpora for Medium Density Languages", In Proceedings of RANLP 2005, pp. 590-596.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.

Vogel, S. and Ney, H., "Construction of a Hierarchical Translation Memory," 2000, Proc. of Cooling 2000, Saarbrucken, Germany, pp. 1131-1135.
Wang, Y. and Waibel, A., "Decoding Algorithm in Statistical Machine Translation," 1996, Proc. of the 35th Annual Meeting of the ACL, pp. 366-372.
Wang, Ye-Yi, "Grammar Inference and Statistical Machine Translation," 1998, Ph.D Thesis, Carnegie Mellon University, Pittsburgh, PA.
Watanabe et al., "Statistical Machine Translation Based on Hierarchical Phrase Alignment," 2002, 9th International Conference on Theoretical and Methodological Issues in Machine Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.
Wu, Dekai, "A Polynomial-Time Algorithm for Statistical Machine Translation," 1996, Proc. of 34th Annual Meeting of the ACL, pp. 152-158.
Wu, Dekai, "Stochastic Inversion Transduction Grammars and Bilingual Parsing of Parallel Corpora," 1997, Computational Linguistics, vol. 23, Issue 3, pp. 377-403.
Yamada, K. and Knight, K. "A Syntax-Based Statistical Translation Model," 2001, Proc. of the 39th Annual Meeting of the ACL, pp. 523-530.
Yamada, K. and Knight, K., "A Decoder for Syntax-Based Statistical MT," 2001, Proceedings of the 40th Annual Meeting of the ACL, pp. 303-310.
Yamada K., "A Syntax-Based Statistical Translation Model," 2002 PhD Dissertation, pp. 1-141.
Yamamoto et al., "A Comparative Study on Translation Units for Bilingual Lexicon Extraction," 2001, Japan Academic Association for Copyright Clearance, Tokyo, Japan.
Yamamoto et al, "Acquisition of Phrase-level Bilingual Correspondence using Dependency Structure" In Proceedings of COLING-2000, pp. 933-939.
Yarowsky, David, "Unsupervised Word Sense Disambiguation Rivaling Supervised Methods," 1995, 33rd Annual Meeting of the ACL, pp. 189-196.
Zhang et al., "Synchronous Binarization for Machine Translations," Jun. 4-9, 2006, in Proc. of the Human Language Technology Conference of the North American Chapter of the ACL, pp. 256-263.
Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.
Patent Cooperation Treaty International Preliminary Report on Patentability and The Written Opinion, International application No. PCT/US2008/004296, dated Oct. 6, 2009, 5 pgs.
Document, Wikipedia.com, web.archive.org (Feb. 22, 2004) /http://en.wikipedia.org/wikii/Document>, Feb. 22, 2004.
Identifying, Dictionary.com, wayback.archive.org (Feb. 28, 2007) </http://dictionary.reference.com/browse/identifying>, accessed Oct. 27, 2011 <http://web.archive.org/web/20070228150533/http://dictionary.reference.com/browse/identifying>.
Koehn, P. et al, "Statistical Phrase-Based Translation," Proceedings of HLT-NAACL 2003 Main Papers, pp. 48-54 Edmonton, May-Jun. 2003.
Abney, S.P., "Stochastic Attribute Value Grammars", Association for Computational Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.
Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.

(56) References Cited

OTHER PUBLICATIONS

Wang, W., et al. "Capitalizing Machine Translation" In HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Dreyer, Markus et al., "HyTER: Meaning-Equivalent Semantics for Translation Evaluation," in Proceedings of the 2012 Conference of the North American Chapter of the Association of Computational Linguistics: Human Language Technologies. Jun. 3, 2012. 10 pages.
Przybocki, M.; Peterson, K.; Bronsart, S.; Official results of the NIST 2008 "Metrics for MAchine TRanslation" Challenge (MetricsMATR08), 7 pages. http://nist.gov/speech/tests/metricsmatr/2008/results/; https://www.nist.gov/multimodal-information-group/metrics-machine-translation-evaluation#history; https://www.nist.gov/itl/iad/mig/metrics-machine-translation-2010-evaluation.
Bangalore, S. and Rambow, O., "Using TAGs, a Tree Model, and a Language Model for Generation," May 2000, Workshop TAG+5, Paris.
Gale, W. and Church, K., "A Program for Aligning Sentences in Bilingual Corpora," 1993, Computational Linguistics, vol. 19, No. 1, pp. 75-102.
Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", In Proceedings of the Association for Machine Translation n the Americas, pp. 223-231, 2006, available at https://www.cs.umd.edu/~snover/pub/amta06/ter_amta.pdf.
Levenshtein, V.I., "Binary Codes Capable of Correcting Deletions, Insertions, and Reversals", 1966, Doklady Akademii Nauk SSSR, vol. 163, No. 4, pp. 707-710.
Hildebrand et al., "Adaptation of the Translation Model for Statistical Machine Translation based on Information Retrieval," EAMT 2005 Conference Proceedings (May 2005), pp. 133-142 (10 pages).
Och et al., "The Alignment Template Approach to Statitstical Machine Translation," Journal Computational Linguistics, vol. 30, Issue 4, Dec. 2004, pp. 417-449 (39 pages).
Sethy et al, "Buidling Topic Specific Language Models from Webdata Using Competitive Models," INTERSPEECH 2005—Eurospeech, 9th European Conference on Speech Communication and Technology, Lisbon, Portugal, Sep. 4-8, 2005. 4 pages.
Potet et al., "Preliminary Experiments on Using Users; Post-Editions to Enhance a SMT System," Proceedings of the15th Conference of the European Association for Machine Translation, May 2011, pp. 161-168.
Ortiz-Martinez et al., "An Interactive Machine Translation System with Online Learning," Proceedings of the ACL-HLT 2011 System Demonstrations, Jun. 21, 2011, pp. 68-73.
Lopez-Salcedo et al., "Online Learning of Log-Linear Weights in Interactive Machine Translation," Communications in Computer and Information Science, vol. 328, 2012. 10 pages.
Blanchon et al., "A Web Service Enabling Gradable Post-edition of Pre-translations Produced by Existing Translation Tools: Practical Use to Provide High Quality Translation of an Online Encyclopedia," Jan. 2009. 8 pages.
Levenberg et al., "Stream-based Translation Models for Statistical Machine Translation," Human Language Technologies: The 2010 Annual Conference of the North American Chapter of the ACL, Jun. 2010, pp. 394-402.
Lagarda et al., "Statistical Post-Editing of a Rule-Based Machine Translation System," Proceedings of NAACL HLT 2009, Jun. 2009, pp. 217-220.

Ehara, "Rule Based Machine Translation Combined with Statistical Post Editor for Japanese to English Patent Translation," MT Summit XI, 2007, pp. 13-18.
Bechara et al., "Statistical Post-Editing for a Statistical MT System," Proceedings of the 13th Machine Translation Summit, 2011, pp. 308-315.
Dobrinkat, "Domain Adaptation in Statistical Machine Translation Systems via User Feedback," Abstract of Master's Thesis, Helsinki University of Technology, Nov. 25, 2008, 103 pages.
Business Wire, "Language Weaver Introduces User-Managed Customization Tool," Oct. 25, 2005, 3 pages. http://www.businesswire.com/news/home/20051025005443/en/Language-Weaver-Introduces-User-Managed-Customization-Tool-Newest.
Winiwarter, "Learning Transfer Rules for Machine Translation from Parallel Corpora," Journal of Digital Information Management, vol. 6, No. 4, Aug. 1, 2008, pp. 285-293 (9 pages).
Office Action dated Mar. 26, 2012 in German Patent Application 10392450.7, filed Mar. 28, 2003.
First Office Action dated Nov. 5, 2008 in Canadian Patent Application 2408398, filed Mar. 27, 2003.
Second Office Action dated Sep. 25, 2009 in Canadian Patent Application 2408398, filed Mar. 27, 2003.
First Office Action dated Mar. 1, 2005 in European Patent Application No. 03716920.8, filed Mar. 27, 2003.
Second Office Action dated Nov. 9, 2006 in European Patent Application No. 03716920.8, filed Mar. 27, 2003.
Third Office Action dated Apr. 30, 2008 in European Patent Application No. 03716920.8, filed Mar. 27, 2003.
Office Action dated Oct. 25, 2011 in Japanese Patent Application 2007-536911 filed Oct. 12, 2005.
Office Action dated Jul. 24, 2012 in Japanese Patent Application 2007-536911 filed Oct. 12, 2005.
Final Office Action dated Apr. 9, 2013 in Japanese Patent Application 2007-536911 filed Oct. 12, 2005.
Office Action dated May 13, 2005 in Chinese Patent Application 1812317.1, filed May 11, 2001.
Office Action dated Apr. 21, 2006 in Chinese Patent Application 1812317.1, filed May 11, 2001.
Office Action dated Jul. 19, 2006 in Japanese Patent Application 2003-577155, filed Mar. 11, 2003.
Office Action dated Mar. 1, 2007 in Chinese Patent Application 3805749.2, filed Mar. 11, 2003.
Office Action dated Feb. 27, 2007 in Japanese Patent Application 2002-590018, filed May 13, 2002.
Office Action dated Jan. 26, 2007 in Chinese Patent Application 3807018.9, filed Mar. 27, 2003.
Office Action dated Dec. 7, 2005 in Indian Patent Application 2283/DELNP/2004, filed Mar. 11, 2003.
Office Action dated Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action dated Aug. 29, 2006 in Japanese Patent Application 2003-581064, filed Mar. 27, 2003.
Office Action dated Jan. 26, 2007 in Chinese Patent Application 3807027.8, filed Mar. 28, 2003.
Office Action dated Jul. 25, 2006 in Japanese Patent Application 2003-581063, filed Mar. 28, 2003.
Proz.com, Rates for proofreading versus Translating, http://www.proz.com/forum/business_issues/202-rates_for_proofreading_versus_translating.html, Apr. 23, 2009, retrieved Jul. 13, 2012.
Graciet C., Volume discounts on large translation project, naked translations, http://www.nakedtranslations.com/en/2007/volume-discounts-on-large-translation-projects/, Aug. 1, 2007, retrieved Jul. 16, 2012.
Editorial FreeLancer Association, Guidelines for Fees, https://web.archive.org/web/20090604130631/http://www.the-efa.org/res/code_2.php, Jun. 4, 2009, retrieved Aug. 9, 2014.

(56) References Cited

OTHER PUBLICATIONS

Wasnak, L., "Beyond the Basics: How Much Should I Charge", https://web.archive.org/web/20070121231531/http://www.writersmarket.com/assets/pdf/How_Much_Should_I_Charge.pdf, Jan. 21, 2007, retrieved Aug. 19, 2014.

Huang et al. "Automatic Extraction of Named Entity Translingual Equivalence Based on Multi-Feature Cost Minimization". In Proceedings of the ACL 2003 Workshop on Multilingual and Mixed-Language Name Entry Recognition.

Notice of Allowance dated Dec. 10, 2013 in Japanese Patent Application 2007-536911, filed Oct. 12, 2005.

Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.

Specia et al. "Improving the Confidence of Machine Translation Quality Estimates," MT Summit XII, Ottawa, Canada, 2009, 8 pages.

Soricut et al., "TrustRank: Inducing Trust in Automatic Translations via Ranking", published in Proceedings of the 48th Annual Meeting of the Association for Computational Linguistics (ACL), Jul. 2010, pp. 612-621.

Marcu, D., "System and Method for Language Translation and Online Advertisement Generation," U.S. Appl. No. 11/454,212, filed Jun. 15, 2006, Specification, Claims, Abstract, and Drawings, 32 pages.

Summons to Attend Oral Proceedings mailed Sep. 18, 2014 in German Patent Application 10392450.7, filed Mar. 28, 2003.

Examination Report dated Jul. 22, 2013 in German Patent Application 112005002534.9, filed Oct. 12, 2005.

Gao et al., Proceedings of the Joint Fifth Workshop on Statistical Machine Translation and Metrics (MATR), 2010, pp. 1-10 and 121-126.

Callison-Burch et al., "Findings of the 2011 Workshop on Statistical Machine Translation," In Proceedings of the Sixth Workshop on Statistical Machine Translation, Edinburgh, Scotland, July. Association for Computational Linguistics, 2011, pp. 22-64.

Bojar et al., "A Grain of Salt for the WMT Manual Evaluation," In Proceedings of the Sixth Workshop on Statistical Machine Translation, Edinburgh, Scotland, Association for Computational Linguistics, Jul. 2011, pp. 1-11.

Przybocki et al., "GALE Machine Translation Metrology: Definition, Implementation, and Calculation," Chapter 5.4 in Handbook of Natural Language Processing and Machine Translation, Olive et al., eds., Springer, 2011, pp. 783-811.

Snover et al., "Fluency, Adequacy, or HTER? Exploring Different Human Judgements with a Tunable MT Metric", In Proceedings of the Fourth Workshop on Statistical Machine Translation at the 12th Meeting of the EACL, pp. 259-268, 2009.

Cormode et al., "The String Edit Distance Matching Problem with Moves," in ACM Transactions on Algorithms (TALG), 3(1):1-19, 2007.

Kanthak et al., "Novel Reordering Approaches in Phrase-Based Statistical Machine Translation," In Proceedings of the ACL Workshop on Building and Using Parallel Texts, Jun. 2005, pp. 167-174.

Allauzen et al., "OpenFst: A General and Efficient Weighted Finitestate Transducer Library," In Proceedings of the 12th International Conference on Implementation and Application of Automata (CIAA), 2007, pp. 11-23.

Denkowski et al., "Meteor 1.3: Automatic Metric for Reliable Optimization and Evaluation of Machine Translation Systems," In Proceedings of the EMNLP 2011 Workshop on Statistical Machine Translation, Jul. 2011, pp. 85-91.

Lavie et al., "The Meteor Metric for Automatic Evaluation of Machine Translation," Machine Translation, Sep. 2009, 23: 105-115.

Crammer et al., "On the Algorithmic Implementation of Multi-Class Kernel-based Vector Machines," In Journal of Machine Learning Research 2, Dec. 2001, pp. 265-292.

Kumar, Shankar, "Minimum Bayes-Risk Techniques in Automatic Speech Recognition and Statistical Machine Translation: A dissertation submitted to the Johns Hopkins University in conformity with the requirements for the degree of Doctor of Philosophy," Baltimore, MD Oct. 2004.

Office Action dated Feb. 2, 2015 in German Patent Application 10392450.7, filed Mar. 28, 2003.

Abney, Steven P., "Parsing by Chunks," 1991, Principle-Based Parsing: Computation and Psycholinguistics, vol. 44, pp. 257-279.

Agbago, A., et al., "Truecasing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Association for Artificial Intelligence, Austin, TX, pp. 672-678.

Al-Onaizan, Y. and Knight K., "Machine Transliteration of Names in Arabic Text," Proceedings of ACL Workshop on Computational Approaches to Semitic Languages. Philadelphia, 2002.

Al-Onaizan, Y. and Knight, K., "Named Entity Translation: Extended Abstract", 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL, pp. 400-408.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennsylvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

Arbabi et al., "Algorithms for Arabic name transliteration," Mar. 1994, IBM Journal of Research and Development, vol. 38, Issue 2, pp. 183-194.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

Bangalore, S. and Rambow, O., "Evaluation Metrics for Generation," 2000, Proc. of the 1st International Natural Language Generation Conf., vol. 14, pp. 1-8.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005), Annual Meeting of the ACL Assoc. for Computational Linguistics, Morristown, NJ, 597-604. DOI=http://dx.doi.org/10.3115/1219840.

Barnett et al., "Knowledge and Natural Language Processing," Aug. 1990, Communications of the ACM, vol. 33, Issue 8, pp. 50-71.

Baum, L., "An Inequality and Associated Maximization Technique in Statistical Estimation for Probabilistic Functions of Markov Processes", 1972, Inequalities 3:1-8.

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

Brants, T., "TnT—A Statistical Part-of-Speech Tagger," 2000, Proc. of the 6th Applied Natural Language Processing Conference, Seattle.

(56) References Cited

OTHER PUBLICATIONS

Brill, E., "Transformation-Based Error-Driven Learning and Natural Language Processing: A Case Study in Part of Speech Tagging", 1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., "The Mathematics of Statistical Machine Translation: Parameter Estimation," 1993, Computational Linguistics, vol. 19, Issue 2, pp. 263-311.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Callan et al., "TREC and TIPSTER Experiments with INQUERY," 1994, Information Processing and Management, vol. 31, Issue 3, pp. 327-343.
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
Monasson et al., "Determining Computational Complexity from Characteristic 'Phase Transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Niessen, S. and Ney, H, "Toward Hierarchical Models for Statistical Machine Translation of Inflected Languages," 2001, Data-Driven Machine Translation Workshop, Toulouse, France, pp. 47-54.
Norvig, Peter, "Techniques for Automatic Memorization with Applications to Context-Free Parsing", Computational Linguistics,1991, pp. 91-98, vol. 17, No. 1.
Och et al., "Improved Alignment Models for Statistical Machine Translation," 1999, Proc. of the Joint Conf. of Empirical Methods in Natural Language Processing and Very Large Corpora, pp. 20-28.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.
Och et al., "Discriminative Training and Maximum Entropy Models for Statistical Machine Translation." Proceedings of the 40th Annual Meeting on Association for Computational Linguistics. Association for Computational Linguistics (ACL), Philadelphia, Jul. 2002; pp. 295-302.
Och, F. and Ney, H., "A Systematic Comparison of Various Statistical Alignment Models," Computational Linguistics, 2003, 29:1, 19-51.
Papineni et al., "BLEU: a Method for Automatic Evaluation of Machine Translation," IBM Research Report, RC22176 (WQ102-022), 2001, 12 pages.
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l. Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Rayner et al.,"Hybrid Language Processing in the Spoken Language Translator," IEEE 1997, pp. 107-110.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hill Book Company [Front Matter].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Zhang, R. et al., "The NiCT-ATR Statistical Machine Translation System for the IWSLT 2006 Evaluation," submitted to IWSLT, 2006.
Russell, S. and Norvig, P., "Artificial Intelligence: A Modern Approach," 1995, Prentice-Hall, Inc., New Jersey [Front Matter].
Sang, E. and Buchholz, S., "Introduction to the CoNLL-2000 Shared Task: Chunking," 2002, Proc. of CoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on Word Sense Disambiguation, vol. 24, Issue 1, pp. 97-123.
Selman et al., "A New Method for Solving Hard Satisfiability Problems," 1992, Proc. of the 10th National Conference on Artificial Intelligence, San Jose, CA, pp. 440-446.
Kumar, S. and Byrne, W., "Minimum Bayes-Risk Decoding for Statistical Machine Translation." HLTNAACL Conference. Mar. 2004, 8 pages.
Shapiro, Stuart (ed.), "Encyclopedia of Artificial Intelligence, 2nd edition", vol. D 2,1992, John Wiley & Sons Inc; "Unification" article, K. Knight, pp. 1630-1637.
Shirai, S., "A Hybrid Rule and Example-based Method for Machine Translation," 1997, NTT Communication Science Laboratories, pp. 1-5. Dec. 1997.
Sobashima et al., "A Bidirectional Transfer-Driven Machine Translation System for Spoken Dialogues," 1994, Proc. of 15th Conference on Computational Linguistics, vol. 1, pp. 64-68.
Soricut et al., "Using a Large Monolingual Corpus to Improve Translation Accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workshop on Computational Approaches to Semitic Language.

(56) References Cited

OTHER PUBLICATIONS

Sumita et al., "A Discourse Structure Analyzer for Japanese Text," 1992, Proc. of the International Conference on Fifth Generation Computer Systems, vol. 2, pp. 1133-1140.

Sun et al., "Chinese Named Entity Identification Using Class-based Language Model," 2002, Proc. of 19th International Conference on Computational Linguistics, Taipei, Taiwan, vol. 1, pp. 1-7.

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

Taylor et al., "The Penn Treebank: An Overview," in A. Abeill (ed.), D Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Empirical Methods in Natural Language Processing and Very Large Corpora.

Tillman, C. and Xia, F., "A Phrase-Based Unigram Model for Statistical Machine Translation," 2003, Proc. of the North American Chapter of the ACL on Human Language Technology, vol. 2, pp. 106-108. Mar. 2003.

Tillmann et al., "A DP Based Search Using Monotone Alignments in Statistical Translation," 1997, Proc. of the Annual Meeting of the ACL, pp. 366-372.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-Based Methods and Machine Learning Models," Natural Language Processing (Shizen Gengo Shori), vol. 10, No. 3, Apr. 2003, pp. 87-114. (Japanese original).

Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation).

Ueffing et al., "Generation of Word Graphs in Statistical Machine Translation," 2002, Proc. of Empirical Methods in Natural Language Processing (EMNLP), pp. 156-163.

O'Brien, Sharon, "Towards predicting post-editing productivity", Sep. 27, 2011, pp. 197-215.

Tatsumi, Midori, "Correlation between Automatic Evaluation Metric Scores, Post-Editing Speed, and Some Other Factors", Jan. 2009, 9 pages.

\* cited by examiner

SYSTEMS AND METHODS FOR TRANSLATING TEXTUAL CONTENT

CROSS-REFERENCE TO RELATED APPLICATION

The present application is a continuation application of U.S. patent application Ser. No. 12/720,536 filed Mar. 9, 2010, issued as U.S Pat. No. 10,417,646 on Sep. 17, 2019, and entitled "Predicting the Cost Associated with Translating Textual Content." The present application is also related to U.S. patent application Ser. No. 12/510,913 filed Jul. 28, 2009, issued as U.S. Pat. No. 8,990,064 on Mar. 24, 2015, and entitled "Translating Documents Based on Content," and to U.S. patent application Ser. No. 12/572,021 filed Oct. 1, 2009, issued as U.S. Pat. No. 8,380,486 on Feb. 19, 2013, and entitled "Providing Machine-Generated Translations and Corresponding Trust Levels." The disclosures of all the aforementioned applications are incorporated herein by reference.

BACKGROUND OF THE INVENTION

Field of the Invention

The present technology relates generally to costs associated with natural language translation. More specifically, the present technology relates to predicting the cost associated with translating textual content.

Related Art

Machine translation of natural languages is presently an imperfect technology and will likely produce imperfect results in the next several decades. For certain bodies of text, a machine translation system may produce outputs of very high quality, which can be published directly to satisfy a given goal. For example, if automatic translation quality is compelling, some customer support documents translated to a target language could be published on the web in order to enable customers who speak the target language to access information that may not be otherwise available. As such, this may lead to a smaller number of customers making support calls, thus reducing overhead costs. For other documents, in contrast, possibly such as marketing materials, automatic translation quality may be too low to warrant their publication. In such cases, human translators may be necessary to translate these other documents.

A significant barrier to adopting machine translation technology is explained by potential customers not being able to know in advance the extent an existing machine translation system will be able to satisfy their needs. For example, current and projected costs of translating text may be difficult or impossible to accurately determine. Therefore, what is needed is a technology to gauge current and future costs associated with translating textual content.

SUMMARY OF THE INVENTION

Embodiments of the present technology allow costs associated with translating textual content to be determined. The present technology may predict the costs of translating existing and expected documents by a combination of human translation and machine translation from a source language to a target language. The documents can include a first textual content identified for human translation and a second textual content identified for machine translation. The cost for translating the documents to the target language may be predicted before the translations are performed.

A prediction of the cost to machine translate the second textual content may be based on a translation quality level associated with one or more portions of the second textual content. For example, a second textual content may be divided into a first portion associated with a higher quality level and a second portion associated with lower quality level. The translation cost associated with the higher quality level may differ then the translation cost associated with the lower quality level. Thus, the predicted cost of translating the second textual content may be determined based on different costs of translating different portions of the textual content via machine translation.

In one claimed embodiment, a method for determining a prediction of the cost associated with translating textual content in a source language is disclosed. The method may include determining a first quantity estimation of first textual content and determining a second quantity estimation of second textual content. The first textual content is to be translated via human translation, whereas the second textual content is to be translated via machine translation. An indication of a target language may also be obtained, wherein the source language and the target language form a language pair. Instructions stored in memory may then be executed using a processor to determine the prediction of the cost associated with translating the first textual content and the second textual content from the source language to the target language. The prediction is based at least in part on the first quantity estimation, the second quantity estimation, and the language pair.

Another claimed embodiment discloses a system for determining a prediction of the cost associated with translating textual content in a source language. The system may include a first assessment module, a second assessment module, a language module, and a cost prediction module, all of which may be stored in memory and executed by a processor to effectuate the respective functionalities attributed thereto. The first assessment module may be executed to obtain a first quantity estimation of first textual content, wherein the first textual content is to be translated via human translation. The second assessment module may be executed to obtain a second quantity estimation of second textual content. The second textual content is to be translated via machine translation. The language module may be executed to obtain an indication of a target language. The source language and the target language form a language pair. The cost prediction module may be executed to determine the prediction of the cost associated with translating the first textual content and the second textual content from the source language to the target language. The prediction is based at least in part on the first quantity estimation, the second quantity estimation, and the language pair.

A computer readable storage medium having a program embodied thereon is also disclosed as a claimed embodiment. The program is executable by a processor to perform a method for determining a prediction of the cost associated with translating textual content in a source language. The method may include determining a first quantity estimation of first textual content, wherein the first textual content is to be translated via human translation. The method may also include determining a second quantity estimation of second textual content, wherein the second textual content is to be translated via machine translation. Obtaining an indication of a target language may be further included in the method. The source language and the target language form a language pair. The method may still further include determining the prediction of the cost associated with translating the first textual content and the second textual content from the source language to the target language. The prediction may be based at least in part on the first quantity estimation, the second quantity estimation, and the language pair.

DETAILED DESCRIPTION OF EXEMPLARY EMBODIMENTS

The present technology may predict the costs for translating existing and expected documents by a combination of human translation and machine translation. Such a body of textual content can include any amount of text ranging, for example, from a few words to a batch of textual items such as websites, books, articles, or letters. The documents can include a first textual content identified for human translation and a second textual content identified for machine translation. The documents that make up the existing textual content, as well as expected textual content that may be forthcoming in the future, may be translated from a current language to a target language. The cost for translating the documents to the target language may be predicted before the translations are performed.

A prediction of the cost to machine translate the second textual content may be based on a translation quality level associated with one or more portions of the second textual content. Different portions of the second textual content may have a different translation quality level, and a corresponding different cost of translation. For example, a second textual content may be divided into a first portion associated with a higher quality level and a second portion associated with lower quality level. The translation cost associated with the higher quality level may differ then the translation cost associated with the lower quality level. Hence, the predicted cost of translating the second textual content may be determined based on different costs of translating different portions of the textual content via machine translation.

It is noteworthy that machine-generated translations obtained by way of statistical-translation techniques and non-statistical-translation techniques fall within the scope of the present technology. Furthermore, while the present technology is described herein in the context of textual translations, the principles disclosed can likewise be applied to speech translations such as when employed in conjunction with speech recognition technologies.

Figure 1:
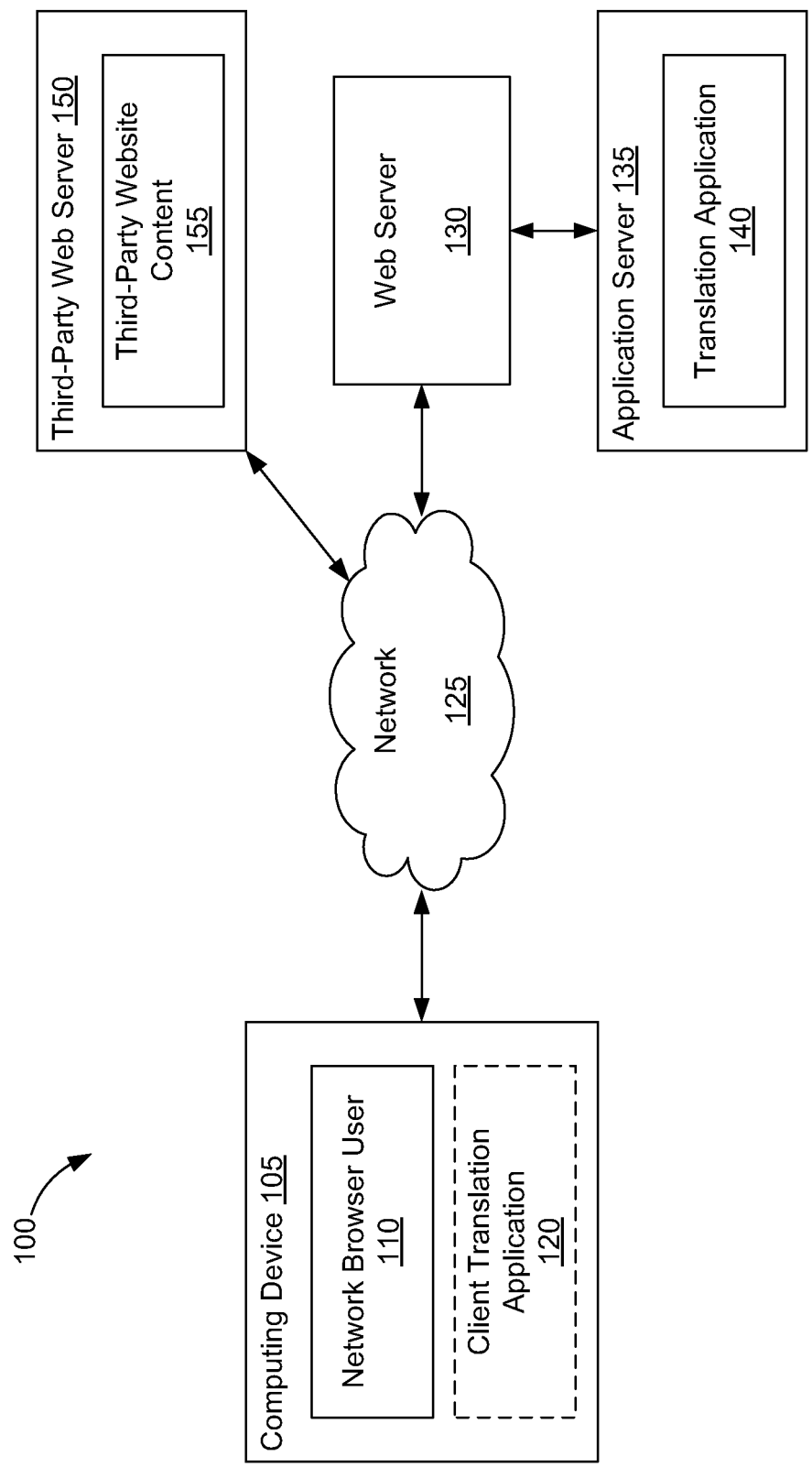
FIG. 1 is a block diagram of an exemplary environment for practicing embodiments of the present technology.

Referring now to FIG. 1, a block diagram of an exemplary environment 100 is shown in which embodiments of the present technology can be practiced. As depicted, the environment 100 includes a computing device 105 providing a network browser 110 and optionally a client translation application 120, a web server 130, an application server 135 providing a translation application 140, and a third-party web server 150 providing third-party website content 155. Communication between the computing device 105, the web server 130, and the third-party web server 150 is provided by a network 125. Examples of the network 125 include a wide area network (WAN), local area network (LAN), the Internet, an intranet, a public network, a private network, a combination of these, or some other data transfer network. Examples of the computing device 105 include a desktop personal computer (PC), a laptop PC, a pocket PC, a personal digital assistant (PDA), a smart phone, a cellular phone, a portable translation device, and so on. The web server 130, the application server 135, and the third-party web server 150 may each be implemented as one or more servers. An exemplary computing system for implementing the computing device 105, the web server 130, the application server 135, and the third-party web server 150 is described in further detail in connection with FIG. 5. Additionally, other various components (not depicted) that are not necessary for describing the present technology also may be included in the environment 100, in accordance with exemplary embodiments.

As mentioned, the computing device 105 may include the network browser 110. The network browser 110 may retrieve, present, traverse, and otherwise process information located on a network, including content pages. For example, network browser 110 can be implemented as a web browser that can process a content page in the form of a web page. The network browser 110 may provide an interface as part of a content page or web page. The interface can be implemented from content page data received from the third-party web server 150 or the web server 130. Via the interface, the computing device 105 can receive an indication from a user to provide a translation from a source language to a target language along with a cost prediction of that translation. The user may provide the indication via the textual content itself, location data for the textual content such as a link (e.g., URL) associated with the textual content, or other information. The indication may convey a desire to obtain a highly accurate translation or a usable translation based on content included in or associated with the textual content. The indication may be forwarded either to the third-party website content 155 or the web server 130 via the network 125.

The computing device 105, as depicted in FIG. 1, can include the client translation application 120. The client translation application 120 may be a stand-alone executable application residing and executing, at least in part, on the computing device 105. The client translation application 120 may also provide an interface for selecting content to have translated. The client translation application 120 may communicate directly with the web server 130, the application server 135, or the third-party web server 150. In the description herein, it is intended that any functionality performed by translation application 140, including providing an interface for implementing various functionality, can also be implanted by the client translation application 120. In some embodiments, client translation application 120 may be implemented in place of translation application 140, which is indicated by the dashed lines comprising the client translation application 120 in FIG. 1.

The web server 130 may communicate both with the application server 135 and over the network 125, for example to provide content page data to the computing device 105 for rendering in the network browser 110. The content page data may be used by the network browser 110 to provide an interface for selecting an indication of a textual content to translate, whether stored over a network or locally to the computing device 105. The web server 130 can also receive data associated with an indication from the computing device 105. The web server 130 may process the received indication and/or provide the indication, and optionally any textual content data, to the application server 135 for processing by translation application 140.

The application server 135 communicates with web server 130 and other applications, for example the client translation applications 120, and includes the translation application 140. In addition to generating translations, the translation application 140 can generate a cost prediction associated with translating current and forthcoming textual content, as discussed in further detail herein. Both translated textual content and cost predictions may be transmitted to a user over the network 125 by the application server 135 and the web server 130, for example, through the computing device 105.

The translation application 140 may be part of a translation system that translates textual content and predicts translation costs. The translation application 140 is described in further detail in connection with FIG. 2. Furthermore, although the translation application 140 is depicted as being a single component of the environment 100, it is noteworthy that the translation application 140 and constituent elements thereof may be distributed across several computing devices that operate in concert via the network 125.

In some embodiments, a content page for allowing a user to configure translation parameters can be provided through the network browser 110. The translation configuration content page data can be provided to the network browser 110 by the web server 130 and/or by the third-party web server 150. When provided by the third-party web server 150, the third-party web server 150 may access and retrieve information from the translation system (i.e., the web server 130 and/or the application server 135) to provide a content page having an interface for configuring. In exemplary embodiments, the translation application 140 is accessed by the third-party web server 150. A graphical user interface (GUI) may be implemented within a content page by the third-party web server 150, rendered in the network browser 110, and accessed by a user via the network browser 110 of the computing device 105. According to exemplary embodiments, the GUI can enable a user to identify a document to be translated and select various options related to translating the documents.

Figure 2:
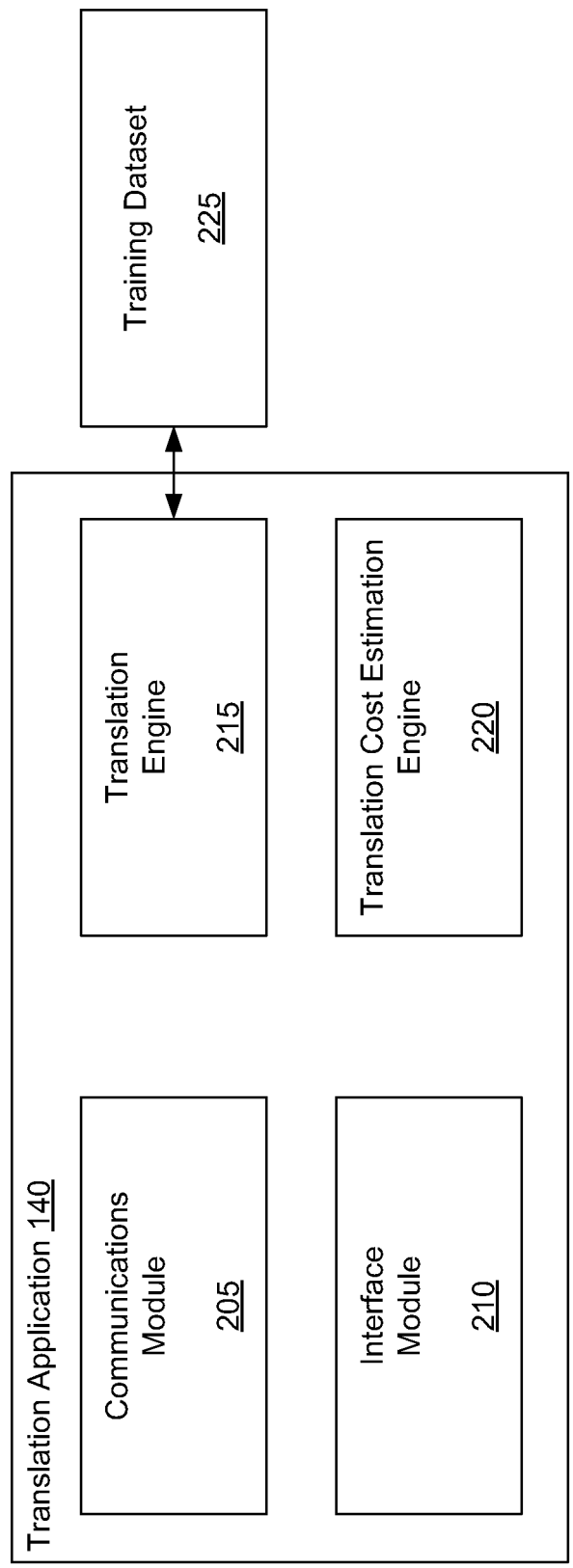
FIG. 2 is a block diagram of an exemplary translation application invoked in the environment depicted in FIG. 1.

FIG. 2 is a block diagram of an exemplary translation application 140 invoked in the environment 100. The translation application 140, as depicted, includes a communications module 205, an interface module 210, a translation engine 215, and a translation cost estimation engine 220. Although FIG. 2 depicts one translation engine 215, the translation application 140 may comprise any number of translation engines and may be in communication with other translation engines via the network 125. The translation engine 215 is associated with the training dataset 225. The training dataset 225 may or may not be included in the translation application 140. Programs comprising engines and modules of the translation application 140 may be stored in memory of a computing system such as the computing device 105, the web server 130, the application server 135, the third-party web server 150, or any computing device that includes the translation application 140. Additionally, the constituent engines and modules can be executed by a processor of a computing system to effectuate respective functionalities attributed thereto. It is noteworthy that the translation application 140 can be composed of more or fewer modules and engines (or combinations of the same) and still fall within the scope of the present technology. For example, the functionalities of the communications module 205 and the functionalities of the interface module 210 may be combined into a single module or engine.

When executed, the communications module 205 allows an indication to be received via a user interface to provide a cost prediction for translating textual content from a source language to a target language. Such a user interface may include the network browser 110 or a GUI provided by the third-party website content 155. The communications module 205 may also facilitate accessing the textual content for which a cost prediction is to be determined such as in response to an indication by a user. The textual content can be accessed based on location information associated with the textual content. Additionally, the textual content can be downloaded from the computing device 105, third-party web server 150, or any other site or device accessible via the network 125. Furthermore, the communications module 205 can be executed such that a cost prediction associated with translating the textual content is outputted from the translation application 140 to devices accessible via the network 125 (e.g., the computing device 105).

The interface module 210 can be executed to provide a graphical user interface through network browser 110, for example as a content page, that enables a user to request the cost prediction. The graphical user interface may also provide various options to a user relating to, for example, pricing or translation domain. According to various embodiments, the graphical user interface may be presented to a user as a content page for network browser 110 via the third-party web server 150 or directly by client translation application 120 at the computing device 105.

The translation engine 215 comprises a machine translation engine capable of translating from a source language to a target language. Such translation capability may result from training the translation engine 215 on various training data. Higher translation accuracy may be achieved for domain-specific translations when a machine translation engine is trained using a training dataset associated with the same domain or similar subject matter as documents being translated. For example, a translation of a car-repair manual may be of higher quality if the machine translation engine employed was trained using a car-repair-domain-specific training dataset compared to, say, a general training dataset or an unrelated-domain-specific training dataset. In some embodiments, the translation application 140 may include more than one translation engine 215. Additionally, the translation engine 215 may be based on statistical-translation techniques, non-statistical-translation techniques, or a combination thereof.

As depicted in FIG. 2, the translation engines 215 is associated with the training dataset 225. According to other exemplary embodiments, the translation engine 215 can be associated with any number of training datasets. The training dataset 225 may comprise documents in source languages and corresponding translations of those documents in target languages (i.e., parallel corpora). The translated documents may be human-generated or machine-generated. The training dataset 225 may be domain-specific or generic. Accordingly, the translation engine 215 may be associated with specific subject matter. For example, the translation engine 215 may be associated with consumer electronics or with agriculture.

According to exemplary embodiments, the translation cost estimation engine 220 is executable to generate a prediction of the cost associated with translating textual content from a source language to a target language. The cost prediction may be indicative of translational costs associated with translating a portion of the textual content using human translators and another portion of the textual content using machine translation. The translation cost estimation engine 220 is described in further detail in connection with FIG. 3.

Figure 3:
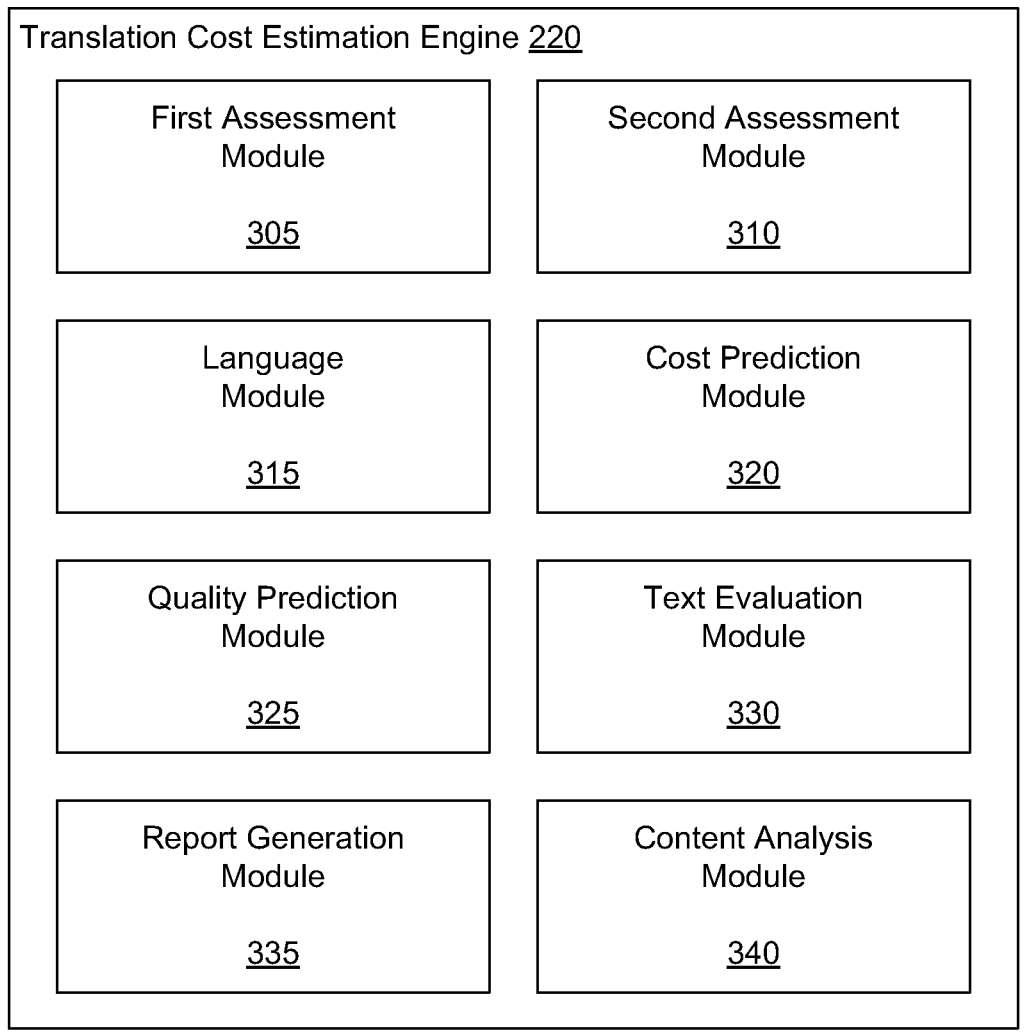
FIG. 3 is a block diagram of an exemplary translation cost estimation engine included in the translation application.

FIG. 3 is a block diagram of an exemplary translation cost estimation engine 220 included in the translation application 140. The translation cost estimation engine 220 provides a cost prediction associated with translating current and forthcoming textual content. The depicted translation cost estimation engine 220 includes a first assessment module 305, a second assessment module 310, a language module 315, a cost prediction module 320, a quality prediction module 325, a text evaluation module 330, a report generation module 335, and a content analysis module 340, all of which may be stored in memory and executed by a processor to effectuate the functionalities attributed thereto. Furthermore, the translation cost estimation engine 220 can be composed of more or fewer modules (or combinations of the same) and still fall within the scope of the present technology. For example, the functionalities of the first assessment module 305 and the functionalities of the second assessment module 310 may be combined into a single module or engine.

The first assessment module 305 can be executed to obtain a first quantity estimation of first textual content. The first textual content is to be translated via human translation. Generally speaking, the first textual content includes text for which a near-perfect translation is desired. As such, human translation is invoked rather than machine translation. An example of the first textual content might include material that would suffer greatly if a nuance or underlying message was not effectively translated, such as marketing materials.

The first quantity estimation can be obtained in a number of ways. The first quantity estimation may be determined by a human. For example, a customer may select a quantity of textual material to be translated by a human, rather than by a machine. Alternatively, the first quantity estimation may be automatically determined, such as through execution of the text evaluation module 330, as discussed further herein. It is noteworthy that the first quantity estimation can be any portion of the total textual content to ultimately be translated, including all textual content or no textual content.

Execution of the second assessment module 310 allows a second quantity estimation of second textual content to be obtained. The second textual content is to be translated via machine translation. In general, the second textual content includes text for which a potentially imperfect translation is acceptable. Thus, machine translation is used, rather than human translation. The second textual content includes material where the gist is conveyable, even if grammar or word choice in not optimal. Technical documentation or casual communication such as chat can be examples of the second textual content.

Like the first quantity estimation, the second quantity estimation can be obtained in a number of ways. The second quantity estimation may be determined by a human. For example, a customer may select a quantity of textual material to be translated by a machine, rather than by a human. Alternatively, the second quantity estimation may be automatically determined, such as through execution of the text evaluation module 330, as discussed further herein. It is noteworthy that the second quantity estimation can be any portion of the total textual content to ultimately be translated, including all textual content or no textual content.

The language module 315 is executed to obtain an indication of a target language, such that the source language and the target language form a language pair. The indication of the target language may be obtained from the user via the interface module 210.

The cost prediction module 320 may be executed to determine the prediction of the cost associated with translating the first textual content and the second textual content from the source language to the target language. The prediction may be based at least in part on the first quantity estimation, the second quantity estimation, and the language pair obtained, respectively, by the first assessment module 305, second assessment module 310, and language module 315.

The quality prediction module 325 is executable to predict a quality level attainable via machine translation of at least a portion of the second textual content. The quality level may be predicted in a number of manners. Exemplary approaches for determining quality levels are disclosed in U.S. patent application Ser. No. 12/572,021 filed Oct. 1, 2009 and entitled "Providing Machine-Generated Translations and Corresponding Trust Levels," which is incorporated herein by reference. In some embodiments, the quality level can be predicted without translating the second textual content. This may be achieved by examining the alignment between the second textual content and training data used to train a given machine translation engine.

It is noteworthy that different portions of the second textual content can each be associated with a different quality estimation. For example, a second textual content may be divided into four portions of 10%, 40%, 30%, and 20% of the total second textual content. The four portions may each be associated with a different quality level. The resulting cost prediction for translating the second textual content may be determined as the sum of the products of content volume and corresponding quality-based translation cost. For four portions or volumes of $L_1$, $L_2$, $L_3$ and $L_4$ and translation costs of $C_1$, $C_2$, $C_3$ and $C_4$, wherein each translation cost is based on a translation quality associated with a particular portion, the cost prediction for the second textual content may be determined as follows:

$$C = L_1 * C_1 + L_2 * C_2 + L_3 * C_3 + L_4 * C_4$$

Furthermore, since machine-translated textual content can potentially require post-editing by a human, a higher predicted quality level may correspond to a lower prediction of the cost associated with translating the second textual content, relative to a lower predicted quality level.

Execution of the text evaluation module 330 supports determination of the quantity estimations of the first and second textual content. For example, the text evaluation module 330 can be executed to identify existing textual content to be translated via human translation, such that the existing textual content to be translated via human translation forms at least a portion of the first quantity estimation obtained by the first assessment module 305. The text evaluation module 330 may also be executed to estimate forthcoming textual content to be translated via human translation, such that the forthcoming textual content to be translated via human translation forms at least a portion of the first quantity estimation obtained by the first assessment module 305.

In addition, the text evaluation module 330 can be executed to identify existing textual content to be translated via machine translation, such that the existing textual content to be translated via machine translation forms at least a portion of the second quantity estimation obtained by the second assessment module 310. The text evaluation module 330 can, furthermore, be executed to estimate forthcoming textual content to be translated via machine translation, such that the forthcoming textual content to be translated via machine translation forms at least a portion of the second quantity estimation obtained by the second assessment module 310.

The report generation module 335 can be executed to generate a report that includes a schedule of cost options associated with the prediction of the cost. According to exemplary embodiments, the cost options are based at least in part on different quantities of the first textual content being translated and different quantities of the second textual content being translated. For example, a customer may want 100% of the first textual content to be translated by a human, but only 60% of the second textual content to be translated by a machine.

Execution of the content analysis module 340 allows determination of a machine translation system to perform the machine translation. Such a determination may be based on content associated with the second textual content. Exemplary approaches for determining which available translation system would best translated given textual content is described in U.S. patent application Ser. No. 12/510,913 filed Jul. 28, 2009 and entitled "Translating Documents Based on Content," which is incorporated herein by reference.

Figure 4:
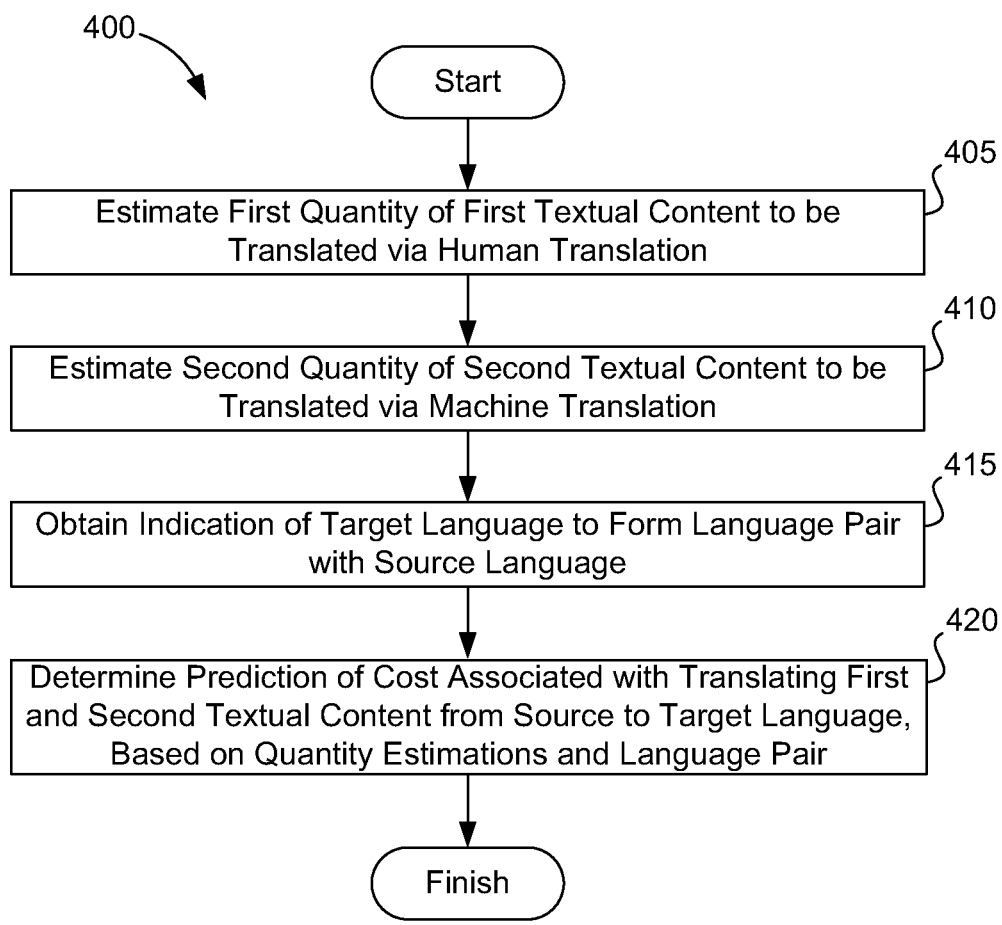
FIG. 4 is a flowchart of an exemplary method for determining a prediction of the cost associated with translating textual content in a source language.

FIG. 4 is a flowchart of an exemplary method 400 for determining a prediction of the cost associated with translating textual content in a source language. The steps of the method 400 may be performed in varying orders. Additionally, steps may be added or subtracted from the method 400 and still fall within the scope of the present technology.

In step 405, a first quantity of first textual content is estimated, wherein the first textual content is to be translated via human translation. The first assessment module 305 may be executed to perform step 405. In alternative embodiments, the text evaluation module 330 may be executed in conjunction with the first assessment module 305 to perform step 405.

In step 410, a second quantity of second textual content is estimated, where the second textual content is to be translated via machine translation. Step 410 may be performed through execution of the second assessment module 310. Alternatively, the text evaluation module 330 and the second assessment module 310 can be executed conjunctively to perform step 410.

In step 415, an indication of a target language is obtained, such that the source language and the target language form a language pair. The language module 315 can be executed to perform step 415.

In step 420, the prediction of the cost associated with translating the first textual content and the second textual content from the source language to the target language is determined. The prediction is based at least in part on the first quantity estimation, the second quantity estimation, and the language pair. Step 420 can be performed by executing the cost prediction module 320. The prediction of the cost associated with translating the second textual content may be based on one or more predicted quality levels, wherein each quality level may be associated with a portion of the second textual content.

Figure 5:
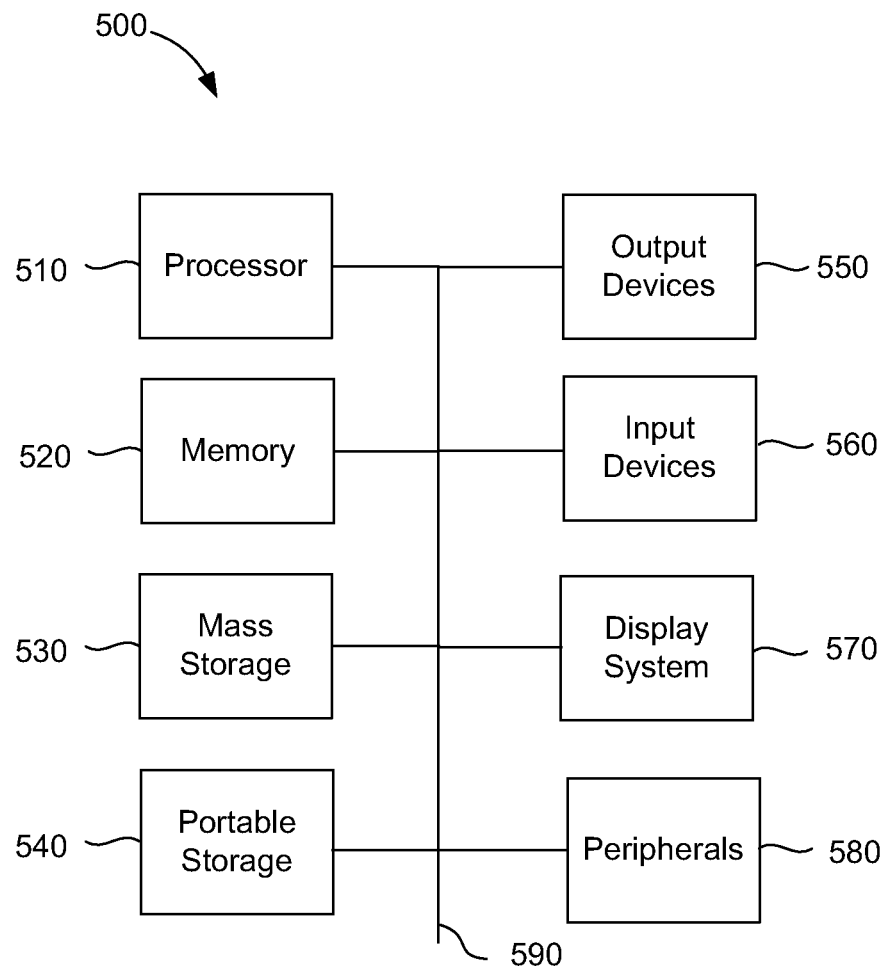
FIG. 5 illustrates an exemplary computing system that may be used to implement an embodiment of the present technology.

FIG. 5 illustrates an exemplary computing system 500 that may be used to implement an embodiment of the present technology. The computing system 500 may be implemented in the contexts of the likes of the computing device 105, a server implementing the third-party website content 155, and a server implementing the translation application 140. The computing system 500 includes one or more processors 510 and main memory 520. Main memory 520 stores, in part, instructions and data for execution by processor 510. Main memory 520 can store the executable code when in operation. The computing system 500 further includes a mass storage device 530, portable storage device 540 (hereinafter portable storage medium drive(s)), output devices 550, user input devices 560, a display system 570 (hereinafter graphics display), and peripherals 580 (hereinafter peripheral device(s)).

The components shown in FIG. 5 are depicted as being connected via a single bus 590. The components may be connected through one or more data transport means. The processor 510 and the main memory 520 may be connected via a local microprocessor bus, and the mass storage device 530, the peripheral devices 580, the portable storage medium drive(s) 540, and display system 570 may be connected via one or more input/output (I/O) buses.

The mass storage device 530, which may be implemented with a magnetic disk drive or an optical disk drive, is a non-volatile storage device for storing data and instructions for use by the processor 510. The mass storage device 530 can store the system software for implementing embodiments of the present technology for purposes of loading that software into the main memory 520.

The portable storage device 540 operates in conjunction with a portable non-volatile storage medium, such as a floppy disk, compact disk, digital video disc, or USB storage device, to input and output data and code to and from the computer system 500 of FIG. 5. The system software for implementing embodiments of the present technology may be stored on such a portable medium and input to the computer system 500 via the portable storage device 540.

The input devices 560 provide a portion of a user interface. The input devices 560 may include an alpha-numeric keypad, such as a keyboard, for inputting alpha-numeric and other information, or a pointing device, such as a mouse, a trackball, stylus, or cursor direction keys. Additionally, the computing system 500 as shown in FIG. 5 includes the output devices 550. Suitable output devices include speakers, printers, network interfaces, and monitors.

The display system 570 may include a liquid crystal display (LCD) or other suitable display device. The display system 570 receives textual and graphical information, and processes the information for output to the display device.

The peripheral device(s) 580 may include any type of computer support device to add additional functionality to the computer system. The peripheral device(s) 580 may include a modem or a router.

The components contained in the computer system 500 of FIG. 5 are those typically found in computer systems that may be suitable for use with embodiments of the present technology and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method comprising:
receiving an estimate of a first quantity of a first type of textual content of documents of a source language, the first type of textual content including text expected to be translated via human translation;
receiving an estimate of a second quantity of a second type of textual content of the documents, the second type of textual content different from the first type of textual content, the second type of textual content including text expected to be translated via machine-generated translation;
executing instructions stored in a memory by a processor to obtain an indication of a target language, the source language and the target language forming a language pair;
training a machine translation system for the language pair using a training dataset;
comparing a machine-generated target-language corpus with a human-generated target-language corpus;
mapping features between the machine-generated target-language corpus and the human-generated target-language corpus using the comparison;
predicting a quality level of the trained machine translation system using the mapping;
executing instructions stored in a memory by the processor to determine a prediction of a first cost associated with translating the first type of textual content and a second cost associated with the second type of textual content from the source language to the target language, the prediction based at least in part on the first quantity estimation, the second quantity estimation, the predicted quality level, and the language pair;
selecting the trained machine translation system to perform machine translations of the second type of textual content based on the predicted quality level of translation of the second type of textual content by the machine translation system;
receiving text for translation;
receiving a selection of a quantity of the received text that is of the second type of textual content to be translated by a machine translation system; and
performing a machine translation of the selected quantity of the received text of the second type of textual content using the selected machine translation system.

2. The method of claim 1, wherein the second quantity estimation is associated with at least one predicted quality level attainable via machine translation of the second textual content.

3. The method of claim 2, wherein each predicted quality level is associated with a translation cost, the amount of the translation cost corresponding to the quality of translation.

4. The method of claim 2, wherein the predicted quality level is determined without translating the second type of textual content.

5. The method of claim 2, wherein a plurality of predicted quality levels are each associated with a different translation cost and a different portion of the second type of textual content.

6. The method of claim 1, wherein estimating the first quantity includes identifying existing textual content to be translated via human translation.

7. The method of claim 1, wherein estimating the first quantity includes estimating expected textual content to be translated via human translation.

8. The method of claim 1, wherein estimating the second quantity includes identifying existing textual content to be translated via machine translation.

9. The method of claim 1, wherein estimating the second quantity includes estimating expected textual content to be translated via machine translation.

10. The method of claim 1, further comprising generating a report that includes a schedule of cost options associated with the prediction of the cost, the cost options based at least in part on different quantities of the first type of textual content being translated and different quantities of the second type of textual content being translated.

11. The method of claim 1, further comprising determining a machine translation system to perform the machine translation, the determination of the machine translation system based on content associated with the second type of textual content.

12. A system for determining a prediction of the cost associated with translating textual content in a source language, the system comprising:
a first assessment module stored in a memory of a smartphone and executable by the smartphone to obtain a first quantity estimation of a first type of textual content of documents of a source language, the first type of textual content including text expected to be translated via human translation;
a second assessment module stored in a memory of the smartphone and executable by the smartphone to obtain a second quantity estimation of a second quantity of a second type of textual content of the documents, the second type of textual content different from the first type of textual content, the second type of textual content including text expected to be translated via machine-generated translation;
a language module stored in a memory and executable by a processor to obtain an indication of a target language, a source language and the target language forming a language pair; and
a cost prediction module stored in a memory and executable by the smartphone to:
compare a machine-generated target-language corpus with a human-generated target-language corpus;
map features between the machine-generated target-language corpus and the human-generated target-language corpus using the comparison;
determine a quality level associated with translational accuracy of future machine-generated translations using the mapping, and
determine a prediction of a first cost associated with translating the first type of textual content and a second cost associated with the second type of textual content from the source language to the target language, the prediction based at least in part on the first quantity estimation, the second quantity estimation, the predicted quality level, and the language pair.

13. The system of claim 12, further comprising a quality estimation module stored in memory and executable by a processor to predict a quality level attainable via machine translation of at least a portion of the second type of textual content.

14. The system of claim 13, wherein a higher predicted quality level corresponds to a lower prediction of the cost associated with translating the second type of textual content, relative to a lower predicted quality level.

15. The system of claim 13, wherein the quality level is predicted without translating the second type of textual content.

16. The system of claim 13, wherein different portions of the second type of textual content are each associated with a different quality estimation.

17. The system of claim 12, further comprising a text evaluation module stored in memory and executable by a processer to perform at least one of the following:
identify existing textual content to be translated via human translation, the existing textual content to be translated via human translation forming at least a portion of the first quantity estimation obtained by the first assessment module;
estimate forthcoming textual content to be translated via human translation, the forthcoming textual content to be translated via human translation forming at least a portion of the first quantity estimation obtained by the first assessment module;
identify existing textual content to be translated via machine translation, the existing textual content to be translated via machine translation forming at least a portion of the second quantity estimation obtained by the second assessment module; and
estimate forthcoming textual content to be translated via machine translation, the forthcoming textual content to be translated via machine translation forming at least a portion of the second quantity estimation obtained by the second assessment module.

18. The system of claim 12, further comprising a report generation module stored in memory and executable by a processor to generate a report that includes a schedule of cost options associated with the prediction of the cost, the cost options based at least in part on different quantities of the first type of textual content being translated and different quantities of the second textual content being translated.

19. The system of claim 12, further comprising a content language module stored in memory and executable by a processor to determine a machine translation system to perform the machine translation, the determination of the machine translation system based on content associated with the second type of textual content.

20. A non-transitory computer-readable storage medium having instructions embodied thereon, the instructions being executable by a processor to perform a method for determining a prediction of the cost associated with translating textual content in a source language, the method comprising:
receiving an estimate of a first quantity of a first type of textual content of documents of the source language, the first type of textual content including text expected to be translated via human translation;
receiving an estimate of a second quantity of a second type of textual content of the documents, the second type of textual content different from the first type of textual content, the second type of textual content including text expected to be translated via machine-generated translation;
executing instructions stored in a memory by a processor to obtain an indication of a target language, the source language and the target language forming a language pair;
training a machine translation system for the language pair using a training dataset;
comparing a machine-generated target-language corpus with a human-generated target-language corpus;
mapping features between the machine-generated target-language corpus and the human-generated target-language corpus using the comparison;
predicting a quality level of the trained machine translation system using the mapping;
executing instructions stored in a memory by the processor to determine a prediction of a first cost associated with translating the first type of textual content and a second cost associated with the second type of textual content from the source language to the target language, the prediction based at least in part on the first quantity estimation, the second quantity estimation, the predicted quality level, and the language pair;
selecting the trained machine translation system to perform machine translations of the second type of textual content based on the predicted quality level of translation of the second type of textual content by the machine translation system;
receiving text for translation;
receiving a selection of a quantity of the received text that is of the second type of textual content to be translated by a machine translation system; and
performing a machine translation of the selected quantity of the received text of the second type of textual content using the selected machine translation system.

* * * * *